United States Patent [19]

Nakagawa et al.

[11] Patent Number: 5,509,190
[45] Date of Patent: Apr. 23, 1996

[54] SYSTEM FOR AND METHOD OF ASSEMBLING WHEELS

[75] Inventors: Ryohta Nakagawa, Toyota; Teruo Kawamura, Okazaki; Kazutoshi Maeda, Toyota, all of Japan

[73] Assignee: Toyota Jidosha Kabushiki Kaisha, Toyota, Japan

[21] Appl. No.: 293,965

[22] Filed: Aug. 24, 1994

[30] Foreign Application Priority Data

Aug. 30, 1993 [JP] Japan .................................. 5-214202

[51] Int. Cl.⁶ .................................................. B23P 21/00
[52] U.S. Cl. ................... 29/712; 29/714; 29/783; 29/784; 29/787
[58] Field of Search ........................ 29/705, 711, 712, 29/714, 783, 784, 786, 787, 793, 794, 795, 799, 802, 823, 824

[56] References Cited

U.S. PATENT DOCUMENTS

| | | | |
|---|---|---|---|
| 4,635,339 | 1/1987 | Kozlowski et al. | 29/794 |
| 4,841,632 | 6/1989 | Namiki et al. | 29/787 |
| 4,942,659 | 7/1990 | Sakurai | 29/783 |
| 5,159,745 | 11/1992 | Kato | 29/795 |
| 5,167,065 | 12/1992 | Koga | 29/802 |
| 5,345,675 | 9/1994 | Yamanaka et al. | 29/468 |

FOREIGN PATENT DOCUMENTS

| | | |
|---|---|---|
| 61-24679 | 2/1986 | Japan . |
| 2-169303 | 6/1990 | Japan . |
| 5-69249 | 3/1993 | Japan ...... 29/802 |

Primary Examiner—David P. Bryant
Attorney, Agent, or Firm—Oblon, Spivak, McClelland, Maier & Neustadt

[57] ABSTRACT

A system of assembling wheels is disclosed, which comprises a steering angle correcting and phase matching unit for correcting the steering angle and also matching the phase of a hub of a car body suspended by a hanger being conveyed while being moved in synchronism with the car body and a wheel setting and hub nut tightening unit or setting a wheel on the phase-matched hub and tightening a nut thereon while being moved in synchronism with the car body. The horizontal distance between the steering angle correcting and phase matching unit and the wheel setting and hub nut tightening unit, is set to a distance such that when the wheel setting and hub nut tightening unit assembles a wheel onto the hub, the steering angle correcting and phase matching unit can correct steering angle and match the phase of the hub on which the next wheel is to be set.

9 Claims, 23 Drawing Sheets

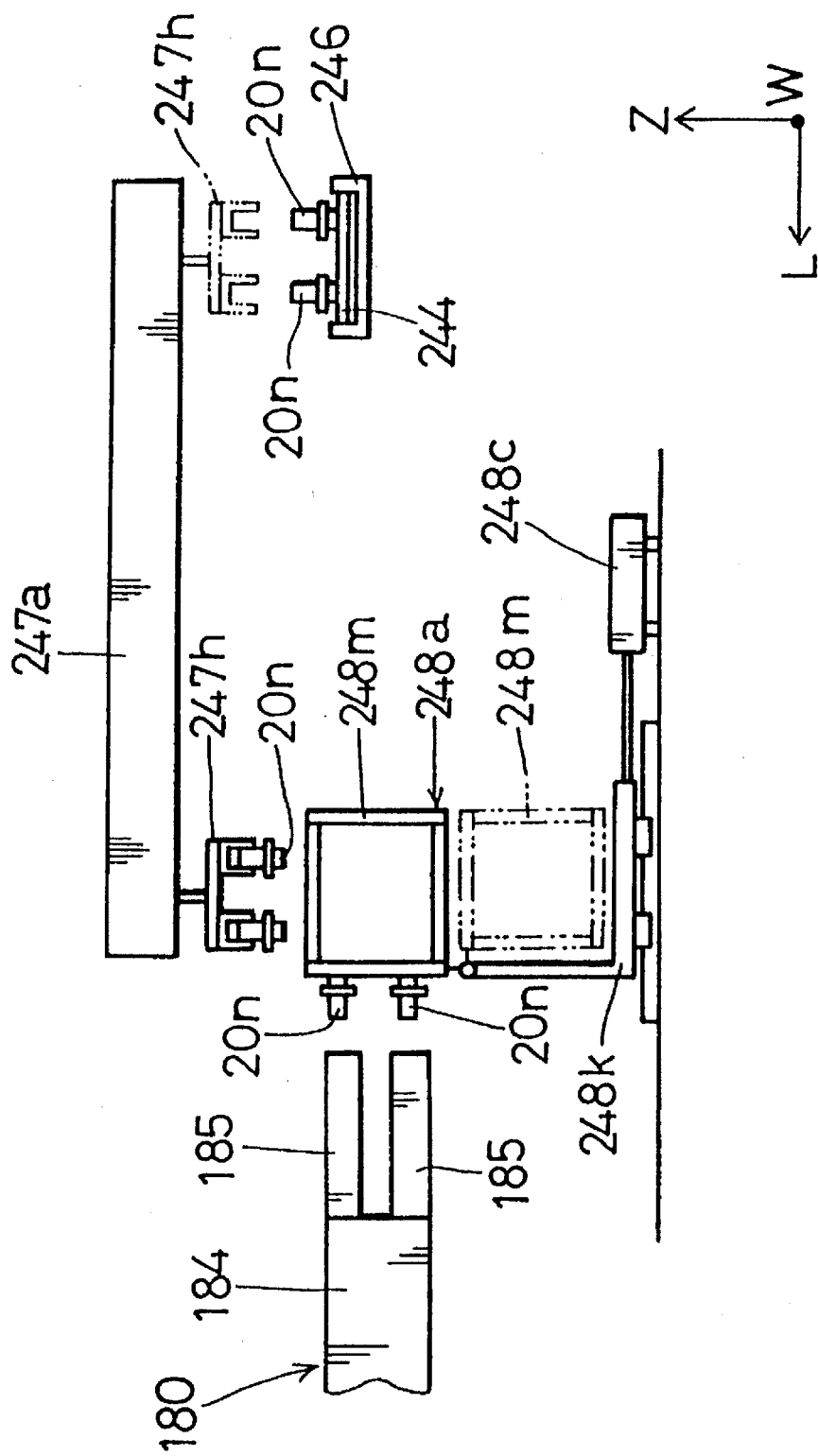

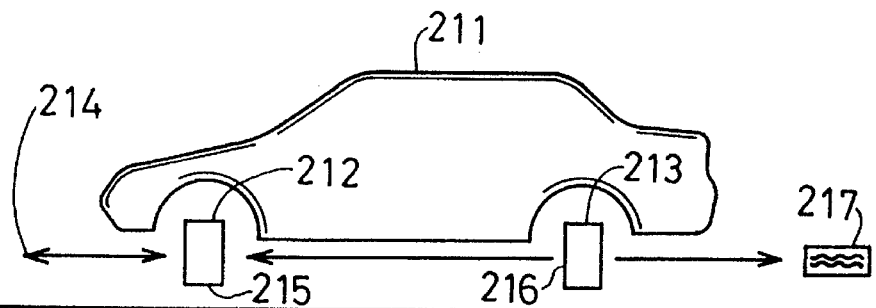

| Stop car body | (1) |
|---|---|
| To front wheel mounting position (1) | Receive rear wheel (2) |
| | To rear wheel mounting position (3) |
| Adjust steering angle (2) | Adjust rear wheel hub (4) |
| | Set rear wheel (5) |
| To retracted position (3) | Tighten (6) |
| | To tire receiving position (7) |
| | Receive front wheel (8) |
| | To front wheel mounting position (9) |
| | Adjust front wheel hub (10) |
| | Set front wheel (11) |
| | Tighten (12) |
| | To tire receiving position (13) |
| Re-start car body | (14) |

FIG.21
PRIOR ART

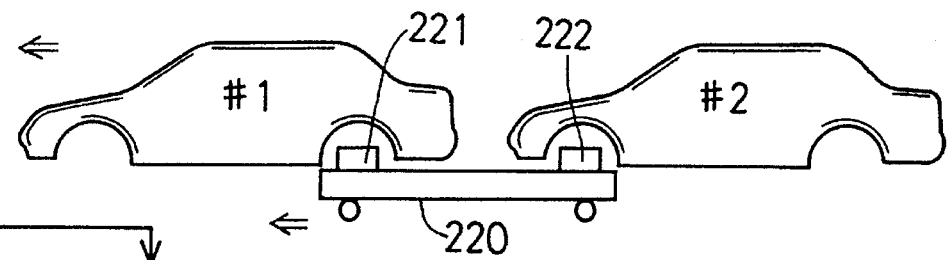
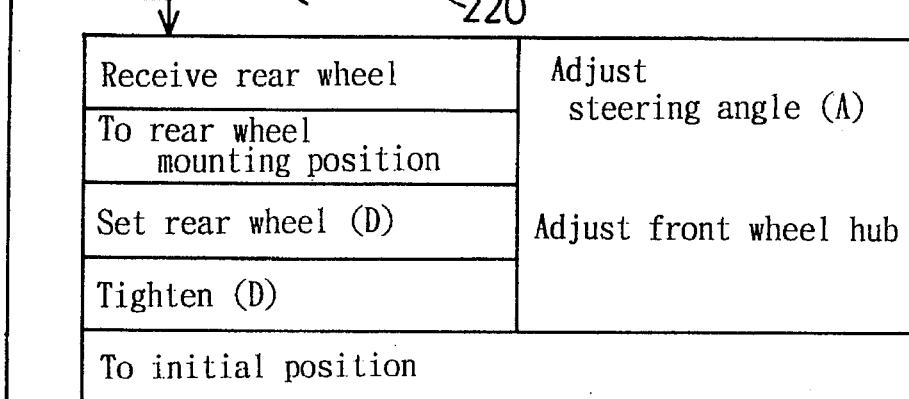
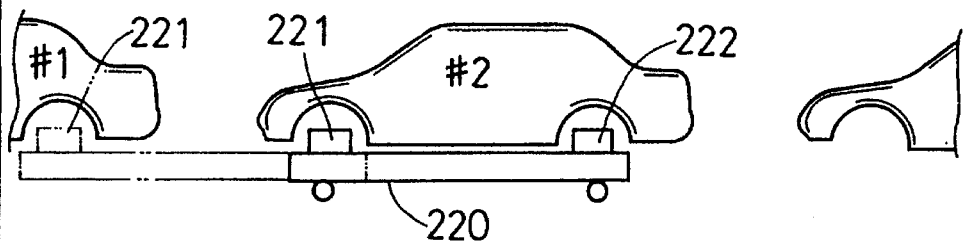
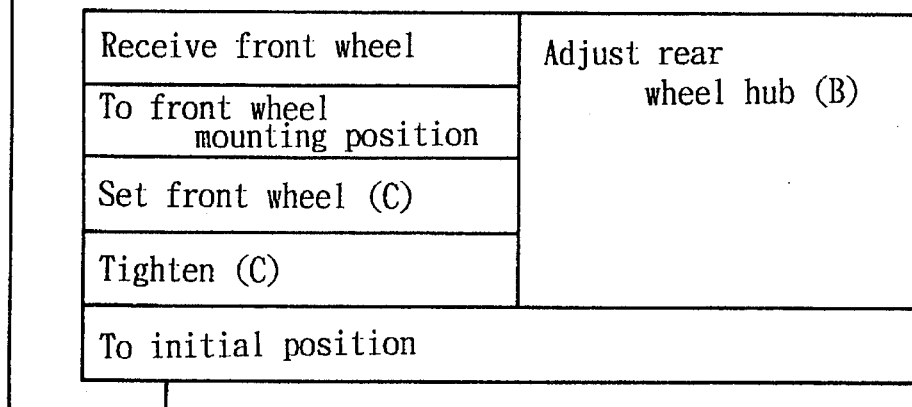
FIG. 22

SYSTEM FOR AND METHOD OF ASSEMBLING WHEELS

BACKGROUND OF THE INVENTION

1. Field of the Invention

This invention relates to a system for assembling wheels onto a car body conveyed in a state suspended by a hanger continuously (i.e., without being stopped).

2. Description of the Prior Art

Japanese Laid-Open Patent Publication No. 2-169303 discloses a system of assembling wheels onto a car body conveyed in a state suspended by a hanger. FIG. 21 schematically shows this system. As shown, the system mainly comprises a steering angle adjusting robot 212 and a wheel mounting robot 213 for adjusting the phase of a hub, setting a wheel on the phase-adjusted hub and then tightening hub nuts thereon.

The steering angle adjusting robot 212 can self-run between a front wheel mounting position 215 of a stationary car body 211 and a retracted position 214. The wheel mounting robot 213 can self-run toga front and a rear wheel mounting position 215 and 216 of the stationary car body 211 and to a wheel receiving position 217.

This wheel assembling system assembles wheels onto the car body 211 by executing a series of routine steps shown in FIG. 21.

(1) First, the hanger suspending the car body 211 is stopped to hold the car body 211 stationary.

(2) Then, the wheel mounting robot 213 receives a wheel for the reap wheel. At this time, the robot receives the wheel with the phase (hub bolt insertion hole angle) thereof preliminarily adjusted.

(3) Then, the robot 213 is moved to the rear wheel mounting position 216.

(4) Then, the robot 213 adjusts the phase (i.e., hub bolt position angle) of the rear wheel hub.

(5) Then, the robot 213 sets the wheel onto the rear wheel hub, that is, inserts each hub bolt into each hub bolt insertion hole. At this time, the wheel is set onto the hub by moving the wheel toward the hub since the phases of the wheel and hub have been adjusted in the steps (2) and (4) noted above.

(6) Then, the robot 213 tightens each hub nut on each hub bolt, thus bringing an end to the assembling of the rear wheel.

(7) Then, the robot 213 is returned to the wheel receiving position 217.

(8) Then, the robot 213 receives a wheel for the front wheel. Again at this time, the robot 213 receives the wheel with the phase thereof preliminarily adjusted.

(9) Then, the robot. 213 is moved to the front wheel mounting position 215.

During the steps (2) to (8), the steering angle adjusting robot 212 executes the following routine steps.

[1] The robot 212 is moved from the retracted position 214 to the front wheel mounting position 215.

[2] Then, the robot 212 orients the front wheel hub in a predetermined direction, that is, adjusts the steering angle of the hub.

[3] Then, the robot 212 is returned to the retracted position 214.

The step [3] is executed before execution of the step (9) to avoid mutual interference of the robots 212 and 213.

Subsequent to the step (9), the wheel mounting robot 213 executes the following steps.

(10) The robot 213 adjusts the phase of the front wheel hub.

(11) Then, the robot 213 sets the wheel onto the front wheel hub.

At this time, the wheel can be set onto the front wheel hub by moving the wheel toward the hub since the phases of the wheel and hub have been adjusted in the steps (8) and (10) and the steering angle or,the front hub has been adjusted in the step [2].

(12) Then, the wheel mounting robot 213 tightens the hub nut on the hub bolt, thus bringing an end to the front wheel assembling.

(13) Then, the robot 213 is returned to the wheel receiving position 217 to be ready for the routine of mounting wheels onto the next car body.

(14) After the above routine has been over, the hanger movement is resumed to move the car body 211 to an extent corresponding to one car.

The above routine is repeated on the next car body to assemble wheels thereon.

The above wheel assembling system is very excellent, but it still has the following points for improvement.

(a) The hanger which suspends and conveys the car body 211 is repeatedly started and stopped in a timed relation to the time required for the operation of assembling wheels on one car body (hereinafter referred to as cycle time).

(b) The hanger which is repeatedly started and stopped is disadvantageous in view of the installation cost and maintenance compared to a hanger which conveys the car body continuously, i.e., without stop.

(c) On the car body 211, an engine and a suspension are assembled as well as wheels. Therefore, usually the cycle time of the wheel assembling operation, that of the engine assembling operation and that of the suspension assembling operation are not equal. It is therefore impossible to convey the car body with a single conveyor over the engine, suspension and wheel assembling zones, that is, it is necessary to provide a conveyor for each of these zones. In addition, it is necessary to transfer the car body from the conveyor in one zone to the conveyor in another zone.

(d) In the prior art system, the wheel mounting robot 213 undertakes the operations of hub phase adjusting, wheel setting and hub nut tightening. Therefore, the wheel mounting robot 213 has to perform a large number of operations in succession, thus leading to long cycle times.

SUMMARY OF THE INVENTION

An object of the invention is to provide a system for assembling wheels onto a car body without stopping a conveyor conveying the car body but while the car body is conveyed continuously.

Another object of the invention is to reduce the number of operations undertaken by the wheel mounting robot, thus permitting cycle time reduction.

A further object of tile invention is to provide a a method of assembling wheels which permits cycle time reduction.

According to the invention, there is provided a system for assembling wheels, which comprises a steering angle correcting and phase matching unit for correcting the steering angle of and matching the phase of each hub of a car body suspended and conveyed by a conveyor while being moved in synchronism with the car body, and a wheel setting and hub nut tightening unit for setting a wheel onto the phase-matched hub and tightening each hub nut thereon while being moved in synchronism with the car body, the horizontal distance between the steering angle correcting and phase matching unit and the wheel setting and hub nut tightening unit being set to a distance such that when the wheel setting and hub nut tightening unit assembles a wheel onto the hub, the steering angle correcting and phase matching unit can correct the steering angle of and match the phase of the hub onto which the next wheel is to be set.

With this system, both the unit execute the wheel mounting routines in synchronism with the movement of the car body, and it is thus possible to make it unnecessary to stop the car body being conveyed. In addition, since the distance between the two units is set to be equal to the inter-axle distance, the routines for the front and rear wheels can be executed concurrently.

Preferably, the steering angle correcting and phase matching unit and the wheel mounting and hub nut tightening unit are mounted on a single truck which can be moved in synchronism with the car body.

Further, very suitably the horizontal distance between the steering angle correcting and phase matching unit and the wheel mounting and hub nut tightening unit is equal to both the horizontal distance between the front and rear wheels of the same car body and to the horizontal distance between the rear wheel of one of a plurality of car bodies being conveyed and the front wheel of the adjacent car body.

With this system, it is possible to permit orderly repeat the group of steps of the steering angle correction and phase matching of the front wheel, the setting of the rear wheel and the tightening of the rear wheel hub nut, and the group of steps of the setting of the front wheel, the tightening of the front wheel hub nut and the phase matching of the rear wheel.

According to the invention, there is further provided a method of assembling wheels, which comprises the steps of:

(A) correcting the steering angle and matching the phase of each front wheel hub;

(B) matching the phase of each rear wheel hub;

(C) setting a front wheel onto each front wheel hub and tightening each hub nut thereon; and (D) setting a rear wheel onto each rear wheel hub and tightening each hub nut thereon;

the steps (A) and (D) being executed at the same time, the steps (B) and (C) being executed at the same time, the steps (A) and (D) and the steps (B) and (C) being executed alternately and repeatedly.

The present invention will be more fully understood from the following detailed description and appended claims when taken with the accompanying drawings.

BRIEF DESCRIPTION OF THE DRAWINGS

FIG. 12 is a side view showing a hub nut feeding mechanism loader and a hub nut transferring unit:

FIG. 21 is a view illustrating a prior art wheel mounting routine;

FIG. 22 is a view showing an example of wheel mounting routine according to the invention.

DETAILED DESCRIPTION OF THE PREFERRED EMBODIMENT

Figure 1:
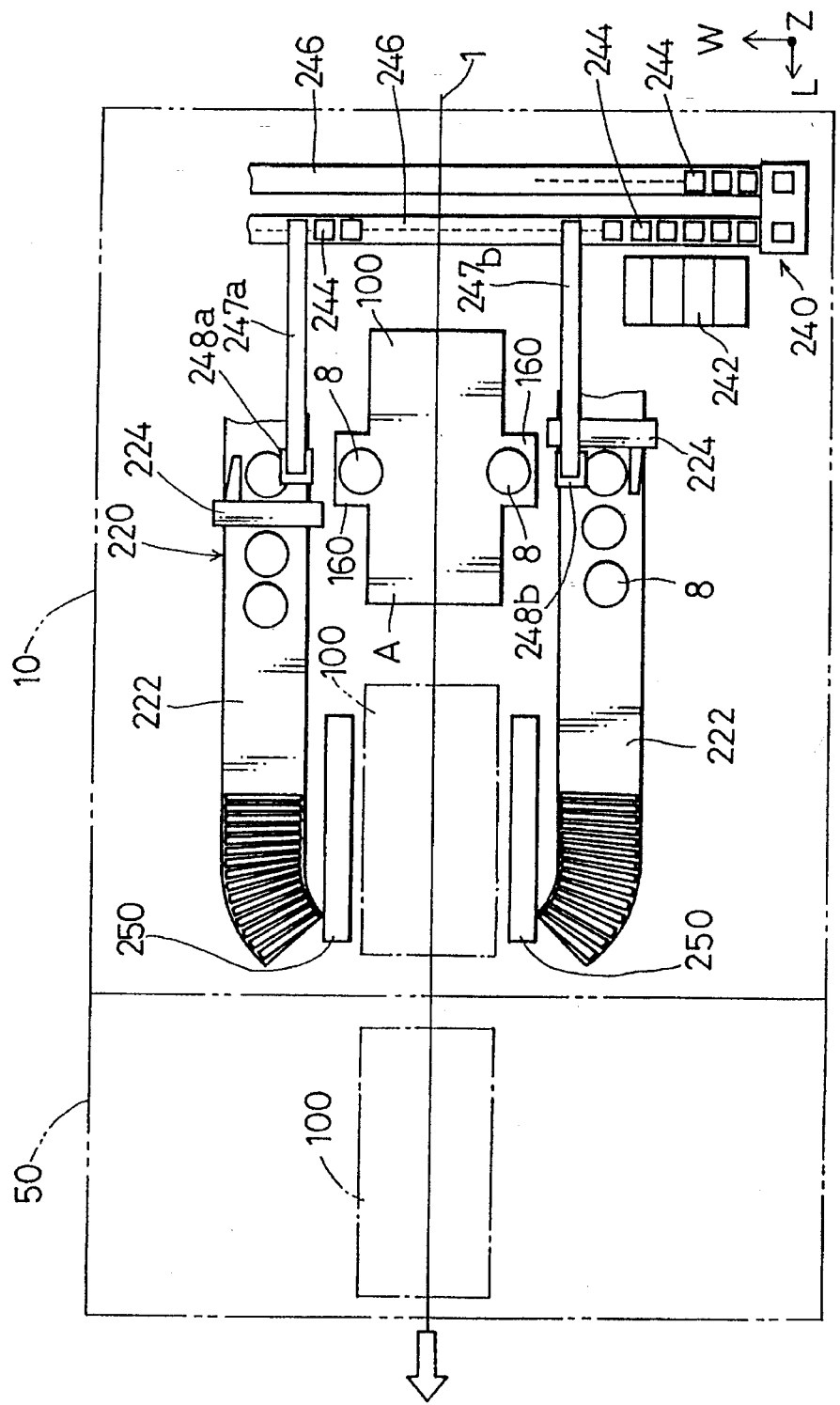
FIG. 1 is an overall lay-out,view showing a system for assembling wheels according to an embodiment of the invention.

In the first place, an outline of the embodiment will be described with reference to FIG. 22. Referring to FIG. 22, car bodies are conveyed continuously (i.e., without being stopped) from right to left by a conveyor. A truck 220 can run along the conveying line. A wheel setting and hub nut tightening unit 221 and a steering angle correcting and phase matching unit 222 are provided on the front and rear sides, respectively, of the truck 220. The distance between the two units is adjusted to be equal to the distance between the rear wheel of a car body #1 and the front wheel of the rear adjacent car body #2 in the conveying direction and also to the distance between the front and rear wheels in the same car body. The distance between the two units is adjustable in order to cope with the case when the distance between the rear wheel of a car body and the front wheel of the rear adjacent car body is not equal to the distance between the front and rear wheels in the same car body.

The truck 220 can run between an initial or start position shown by solid lines and an end position shown by phantom lines. From the initial position to the end position, the truck 220 is moved together with the car body, while it self-runs from the end position to the initial position. The truck 220 includes a wheel receiving unit to receive a wheel at the initial position. The received wheel is brought to a wheel mounting position.

Description will now be given from a state in which the wheel setting and hub nut tightening unit 221 corresponds to the rear wheel of a car body while the steering angle correcting and phase matching unit 222 corresponds to the front wheel of the rear adjacent car body in the conveying direction. In this case, while maintaining this positional relation, (A) the steering angle correcting and phase matching unit 222 corrects the steering angle of the front wheel hub and matches the phase thereof, and (D) the wheel setting and hub nut tightening unit 221 sets a rear wheel onto the rear wheel hub and tightens each hub nut thereon.

During this time, the truck 220 is moved to the end position because the car body is conveyed. Subsequently, the truck 220 is returned to the initial position. Then, the wheel setting and hub nut tightening unit 221 is brought to a position to correspond to the front wheel, while the steering angle correcting and phase matching unit 222 is brought to a position to correspond to the rear wheel of the same car body. Thereafter, the truck 220 starts to be moved again in synchronism with the car body. In this case, while maintaining this positional relation, (B) the steering angle correcting and phase matching unit 222 matches the phase of the rear wheel hub, and (C) the wheel setting and hub nut tightening unit 221 sets a front wheel onto the front wheel hub and tightens each hub nut thereon.

During this time, the truck 220 is moved to the end position. Thus, it is returned to the initial position. At this time, the initial state noted before is restored. The system repeatedly executes the above sequence of operations.

In this system, the step (A) is executed before the step (C), and the step (B) is executed before the step (D). Thus, wheels can be assembled smoothly.

Figure 23:
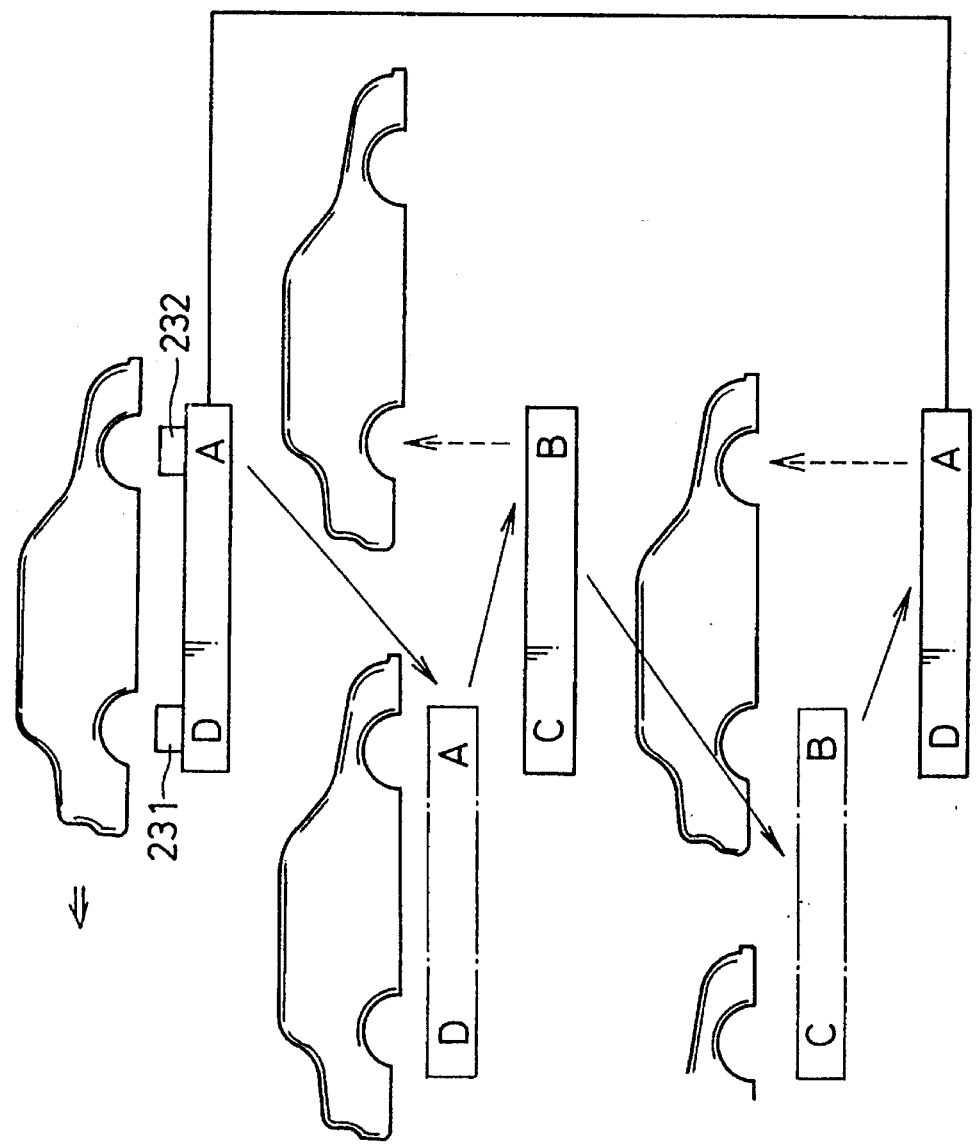
FIG. 23 is a view showing a different example of wheel mounting routine according to the invention.

The above description is applicable to a case of a car body which is conveyed in a rearwardly directed state as shown in FIG. 23. Reference symbols A to D in FIG. 23 corresponds to the routine steps (A) to (D) described above.

Now, a wheel assembling system according to an embodiment of the invention will be described with reference to FIGS. 1 to 20. As shown in FIG. 2, this wheel assembling system serves for automatically assembling wheels 8 onto he front and rear wheel hubs 2h of each car body 2 suspended and conveyed by a hanger 4. FIG. 1 shows an overall lay-out of the system.

The system comprises an automatic assembling station 10 for automatically assembling wheels 8 on the hubs 2h of each car body 2, and a back-up station 50 for making corrections, these stations being disposed along and beneath a car body conveying line 1. In the following description, the direction of progress along the car body conveying line 1 is referred to as L-axis direction, the transverse direction of the line is referred to as W-axis direction, and the vertical direction is referred to as Z-axis direction.

In the automatic assembling station 10, a truck 100 is provided which can be reciprocated in the L-axis direction in a predetermined range beneath the car body conveying line 1. The truck 100 is driven by a servo motor, and it can run at the same speed as the car body 2 suspended by the hanger 4 according to a car body conveying speed signal of the car body conveying line 1. Further, when predetermined operations to be described later have been completed, the truck 100 can be returned at a high speed to its initial position A.

Figure 3:
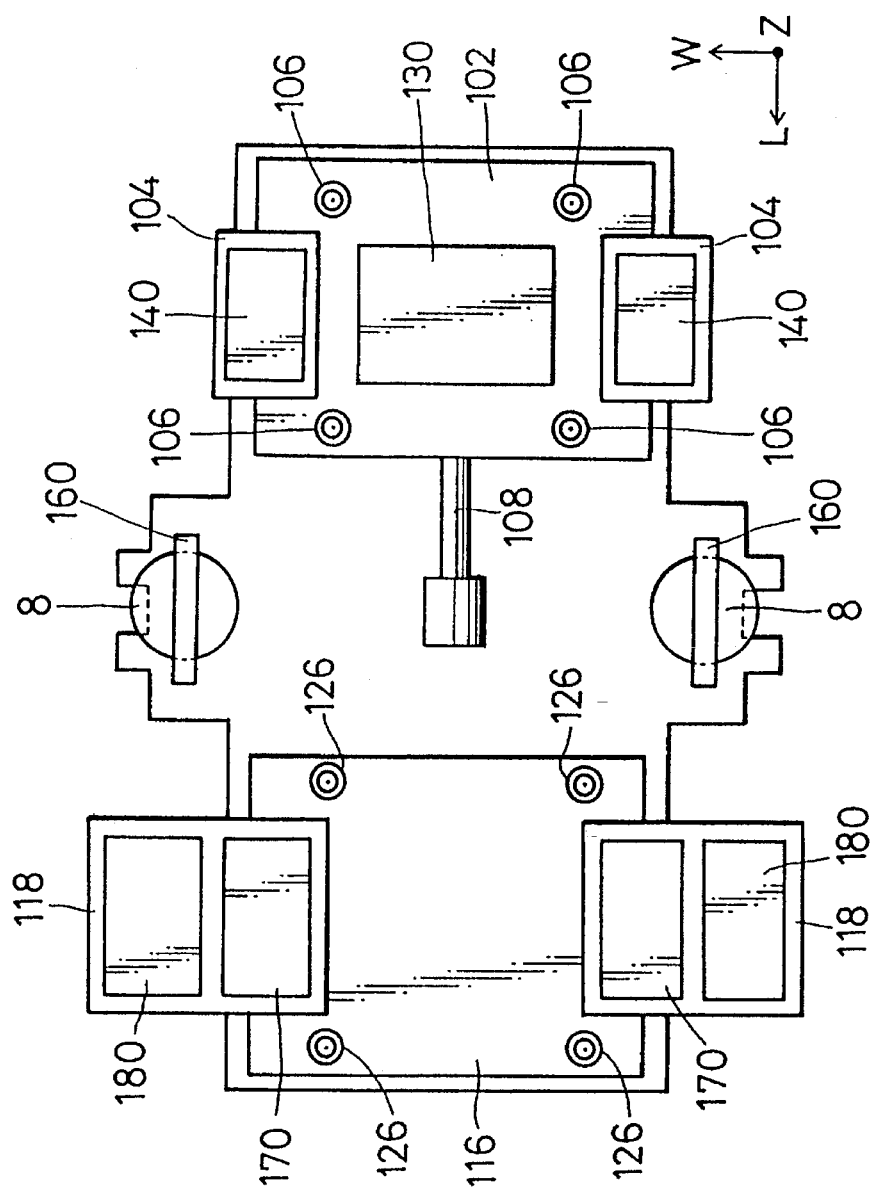
FIG. 3 is a plan view showing a truck used in the wheel assembling system.

As shown in FIG. 3, on a rear portion of the truck 100, a rear table 102 is mounted, which is a floating table capable of displacement in the L- and W-axis directions and also in the θ direction (i.e., direction of horizontal rotation). A steering angle correcting mechanism 130 is mounted on the rear table 102 in a central portion thereof. A hub phase matching mechanism 140 is mounted via a rear lift table 104 on the rear table 102 on each side thereof in the transverse direction. Reference pins 106 are provided via lift means on the rear table 104 at prescribed positions thereof. The rear table 102 is positioned to be in a predetermined positional relation to the car body 2 when the reference pins 106 are raised and inserted into reference holes (not shown) provided in the hanger 4.

Further, the rear table 102 can be moved by a pitch switch cylinder mechanism 108 by a predetermined distance in the L-axis direction above the truck 100.

Figure 4:
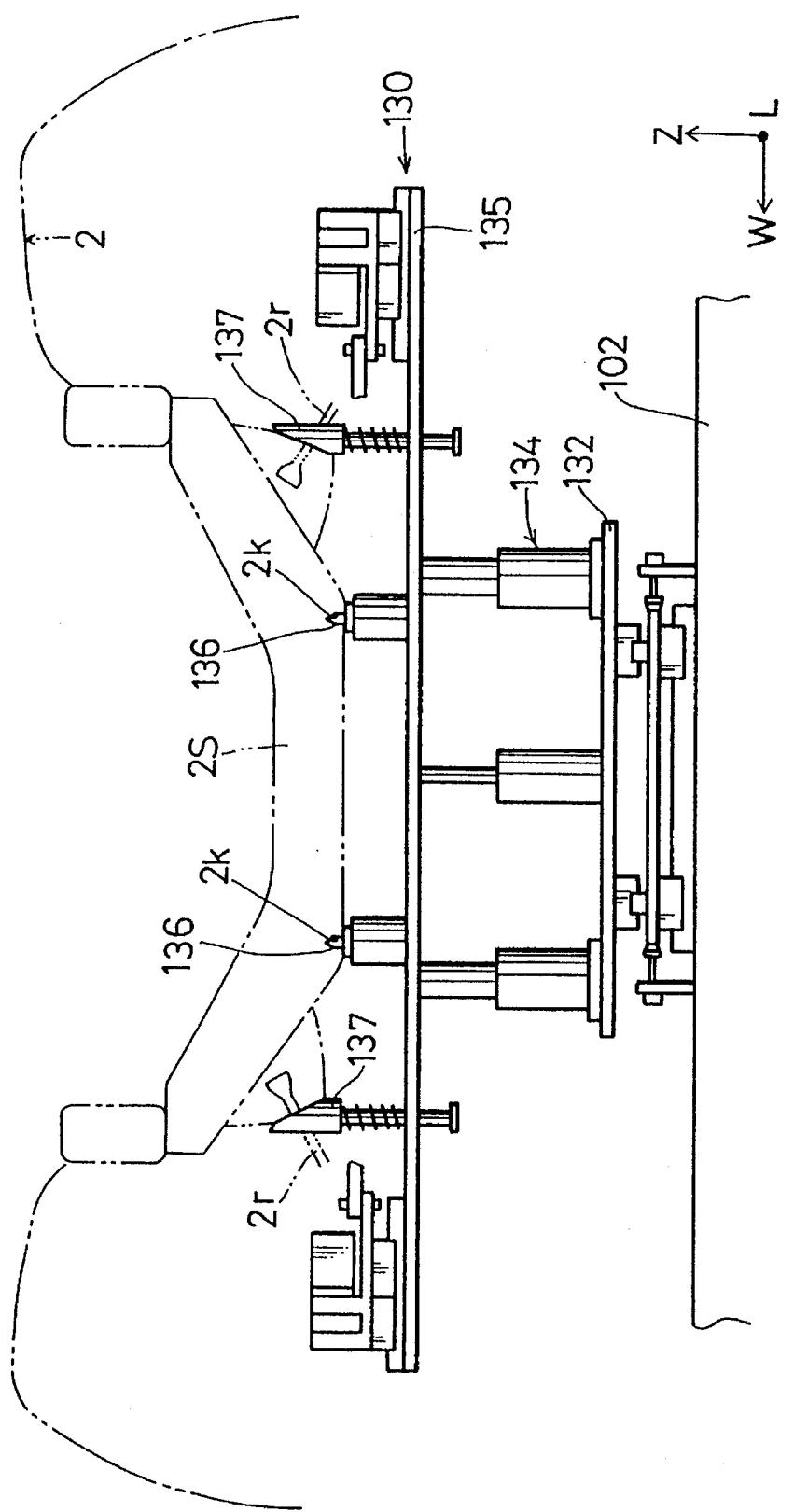
FIG. 4 is a front view showing a steering angle adjuster.
Figure 5:
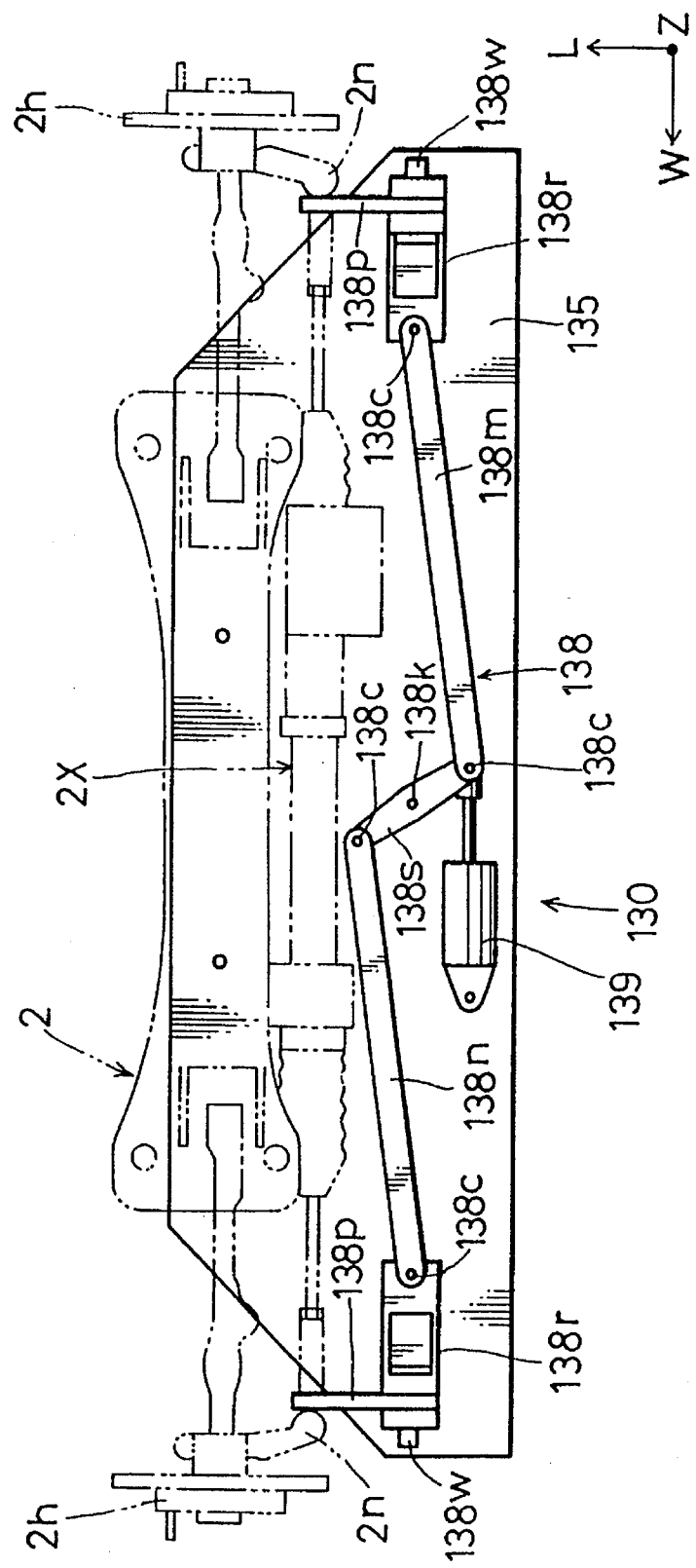
FIG. 5 is a plan view showing the steering angle adjuster.

The steering angle correcting mechanism 130 serves for automatically correcting the steering angle such that the hubs 2h of the car body 2 are parallel to the progress direction (i.e., L-axis direction), and it is shown in detail in FIGS. 4 and 5.

The steering angle correcting mechanism 130 includes a floating table 132 capable of displacement in the L- and W-axis directions, and a reference table 135 is mounted via a lift mechanism 134 on the floating table 132. Pins 136 and bracket support members 137 are mounted on the reference table 135 at prescribed positions thereof such that they engage reference holes 2k in a sub-frame 2s of the car body 2 and lower arms 2r thereof, respectively, during the rising of the reference table 135. As shown in FIG. 5, on the reference table 135 is mounted an arm pushing mechanism 138 which serves to outwardly push knuckle arms 2n of a steering unit 2x of the car body 2 to an equal extent from the transverse direction inside of the car body 2.

The arm pushing mechanism 138 includes a link mechanism having a short bar 138s capable of rotation about a fixed pin 138k and two long bars 138n each coupled by a coupling pin 138c to each end of the short bar 138s. A slider 138r is coupled by a coupling pin 138c to the end of each long bar 138n. A rotation cylinder mechanism 139 is coupled to one end of the short bar 138s to cause rotation of the short bar 138s about the fixed pin 138k.

The slider 138r is mounted via a slide (not shown) on a short rail 138w laid in the W-axis direction. A pushing member 138p for pushing each knuckle arm 2n is mounted on the slider 138r.

With this construction, when the reference table 135 is raised with the operation of the lift mechanism 134, during the rising movement, the pins 136 and the bracket support members 137 of the reference table 135 engage the reference holes 2k in the sub-frame 2s of the car body 2 and the lower arms 2r. As a result, the reference table 135 is positioned to be in a predetermined positional relation to the car body 2. In this state, the rotation cylinder mechanism 139 is operated such that its piston rod is advanced. As a result, the link mechanism of the arm pushing mechanism 138 is driven to cause the pushing members 138p of the sliders 138r to outwardly push the knuckle arms 2n to an equal extent from the transverse direction inside of the car body 2. As a result, steering angle correction is effected such as to make the hubs 2h of the car body 2 to be parallel to the progress direction (i.e., L-axis direction).

Figure 6A:
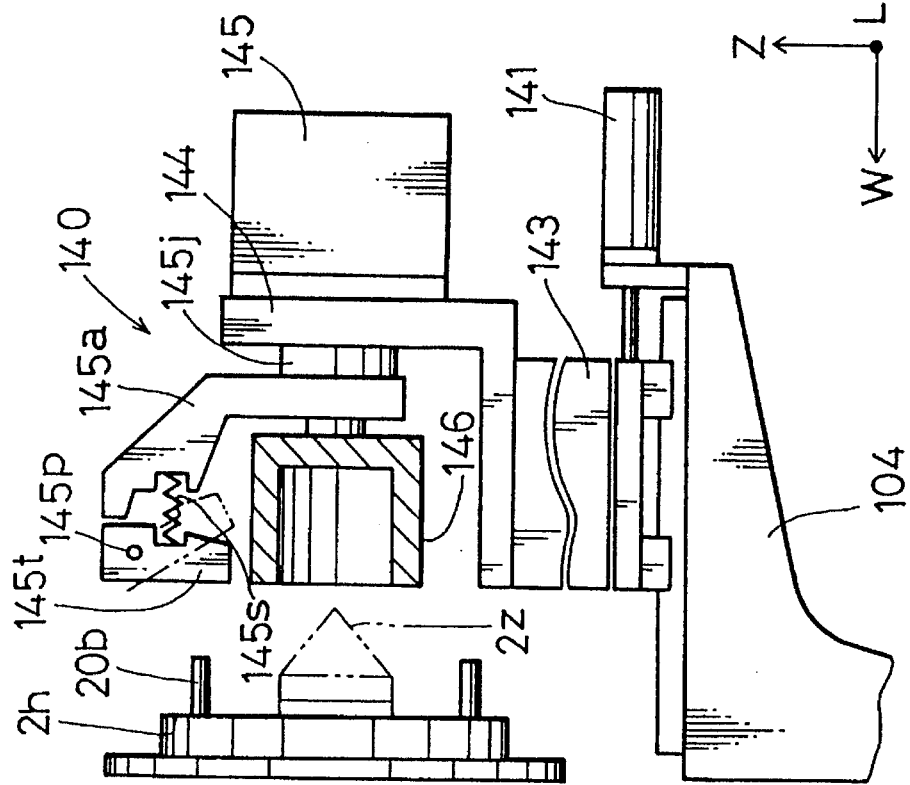
FIGS. 6(A) and 6(B) are a front view and a side view, respectively, showing a hub phase matching mechanism.
Figure 6B:
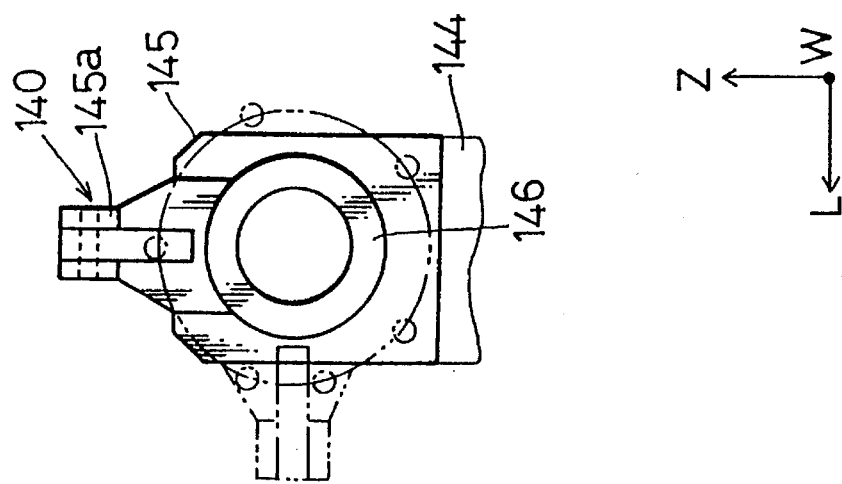
Figure 7A:
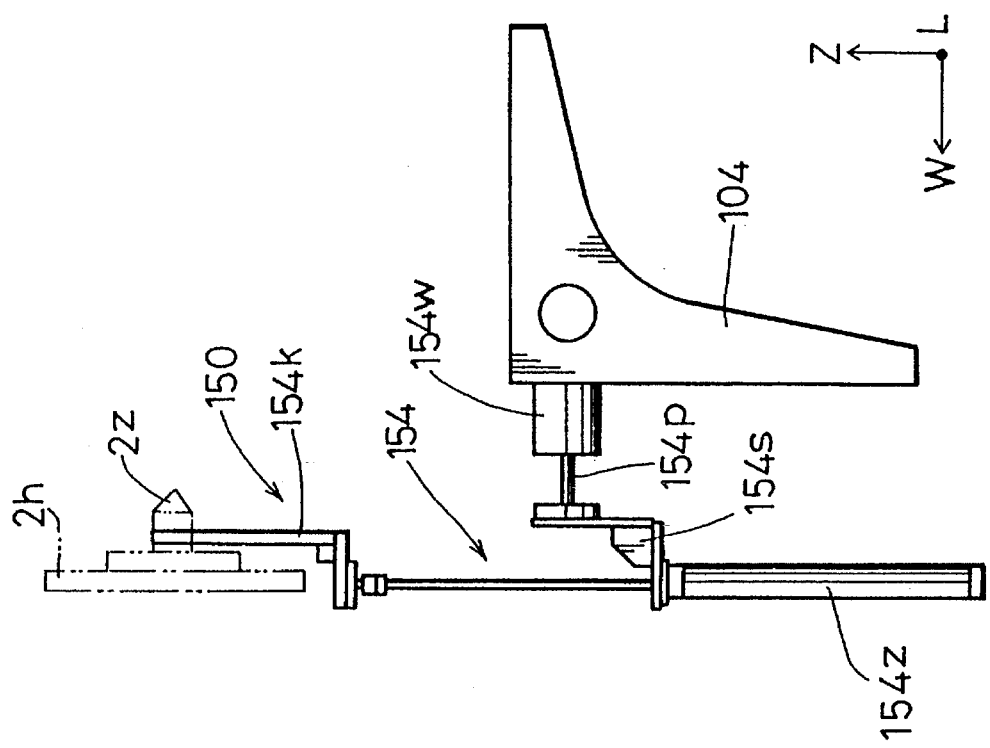
FIGS. 7(A) and 7(B) are a side view and a fragmentary detailed view, respectively, showing a hub height detecting mechanism.
Figure 7B:
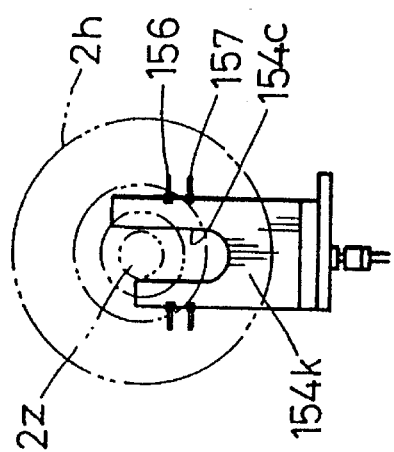

The hub phase matching mechanism 140 serves for matching the phase of five bolts 20b provided on each hub 2h of the car body 2, and it is shown in detail in FIGS. 6(A) and 6(B).

The hub phase matching mechanism 140 includes a movable table 142 which is provided on the rear lift table 104 and movable by a W-axis cylinder mechanism 141 in the W-axis directions (i.e., transverse directions of the truck). An L-shaped frame 144 is mounted on the movable table 142 via an L, Z and θ direction floating mechanism 143. A rotary actuator 145 is mounted on the vertical wall of the L-shaped frame 144 such that it is parallel to the W-axis. The rotary actuator 145 has a shaft 145j which can be rotated by a predetermined angle φ (about 90°). A substantially L-shaped arm 145a is perpendicularly secured to the extreme end of the shaft 145j. The arm 145 has its other side portion extending substantially parallel with and projecting from the shaft 145j. Thus, when the rotary actuator 145 is driven, the arm 145a is rotated from its vertical position to its horizontal position.

A pawl 145t is coupled to the extreme end of the arm 145a such that it can be rotated about a pin 145p from its state at right angles to the arm 145a until it is brought into contact with the arm 145a. Between the pawl 145t and the arm 145a, a spring 145s is mounted such as to hold the pawl 145t at right angles to the arm 145a. The distance between the axis of the shaft 145j of the rotary actuator 145 to the pawl 145t is set to be substantially equal to the distance from the center of the hub 2h of the car body 2 to each hub bolt 20b.

A cylindrical guide ring 146 is coupled coaxially to the extreme end of the shaft 145j of the rotary actuator 145 for rotation relative to the shaft 145j. The inner diameter of the guide ring 146 is set to be substantially equal to the outer diameter of a guide gap 2z which is fitted on the center of the hub 2h. The guide cap 2z has a conical end.

With this construction, when the guide cap 2z of the hub 2h is inserted into the cylindrical guide ring 146 located at the end of the rotary actuator 145 with movement of the movable table 142 in the W-axis direction, during the insertion of the guide cap 2z into the guide ring 146, the center line of the rotary actuator 145 is aligned with the center line of the guide cap 2z by the action of the floating mechanism 143. Next, when the rotary actuator 145 is driven in this state to cause rotation of the arm 145a from the vertical position to the horizontal position, the pawl 145t at the end of the arm 145a is brought into contact with the side face of one of the hub bolts 20b secured to the hub 2h and causes rotation of that hub bolt 20b up to the horizontal position. In this way, the phase matching of the hub 2h is completed.

The above steering angle correcting mechanism 130, hub phase matching mechanism 140, rear table 102, rear lift table 104, etc. altogether correspond to the steering angle correcting and phase matching unit according to the invention.

A hub height detecting mechanism 150 is mounted on the rear lift table 104 of the truck 100. The hub height detecting mechanism 150 serves for detecting the height of the hub 2h of the car body 2 from a reference position, i.e., the lowest level position of the rear lift table 104, and it is shown in detail in FIGS. 7(A) and 7(B).

As shown, the hub height detecting mechanism 150 includes a lift distance sensor (lift motor encoder, see FIG. 15) for detecting the distance of lift covered by the rear lift table 104 from the reference position, and a stopping mechanism 154 for stopping the rising of the rear lift table 104 upon reaching of the height of the hub 2h by the height of the hub phase matching mechanism 140. The stopping mechanism 154 has a W-axis cylinder mechanism 154w secured to the rear lift table 104. A Z-axis cylinder mechanism 154z is mounted via a support 154s on a piston rod 154p of the W-axis cylinder mechanism 154w. A sensor plate 154k having a U-shaped notch 154c is mounted on the extreme end (upper end) of a piston rod 154r of the Z-axis cylinder mechanism 154z. The width of the notch 154c of the sensor plate 154k is set to be greater than the diameter of the guide cap 2z mounted on the hub 2h. Two photoelectric switches 156 and 157 are provided on the sensor plate 154k at a spacing in the vertical direction of the notch 154c.

Figure 15:
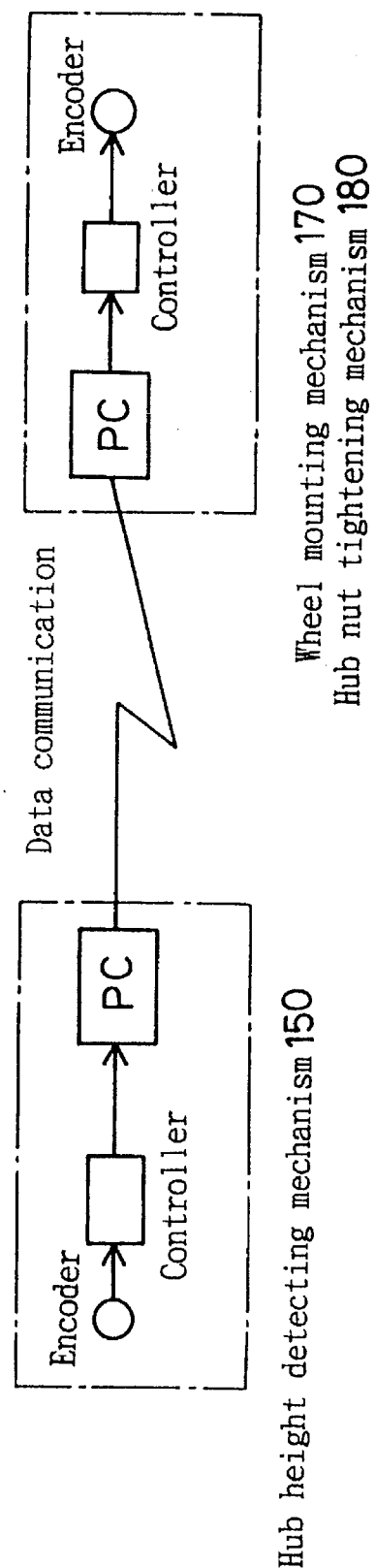
FIG. 15 is a block diagram illustrating a state of hub height data transmission.

When detecting the height of the hub 2h, the W-axis cylinder mechanism 154w is driven to bring the sensor plate 154k to be right beneath the guide cap 2z mounted on the hub 2h, and also the piston rod 154r of the Z-axis cylinder mechanism 154z is fully advanced. In this state, the rear lift table 104 is lifted from the reference position, thus lifting the entire stopping mechanism 154 including the sensor plate 154k, etc. Thus, the guide cap 2z is inserted in the notch 154c of the sensor plate 154k. When the upper photoelectric switch 156 of the sensor plate 154k is operated, the rising speed of the rear lift table 104 is switched over to a low speed. When the lower photoelectric switch 157 is subsequently operated, that is, when the height of the hub phase matching mechanism 140 becomes equal to the height of the hub 2h, the rising of the rear lift table 104 is stopped. At this time, the distance of lift covered by the rear lift table 104 from the reference position is measured by the lift distance sensor. It is thus possible to detect the height of the hub 2h of the car body 2 from the reference position. The data of the height of the hub 2h which has been obtained in this way, is transmitted to a wheel mounting mechanism 170 and a hub nut tightening mechanism 180 to be described later, as shown in FIG. 15.

As shown in FIG. 3, a wheel phase matching mechanism 160 is mounted on a central portion of the truck 100 on each side thereof in the transverse direction.

Figure 8:
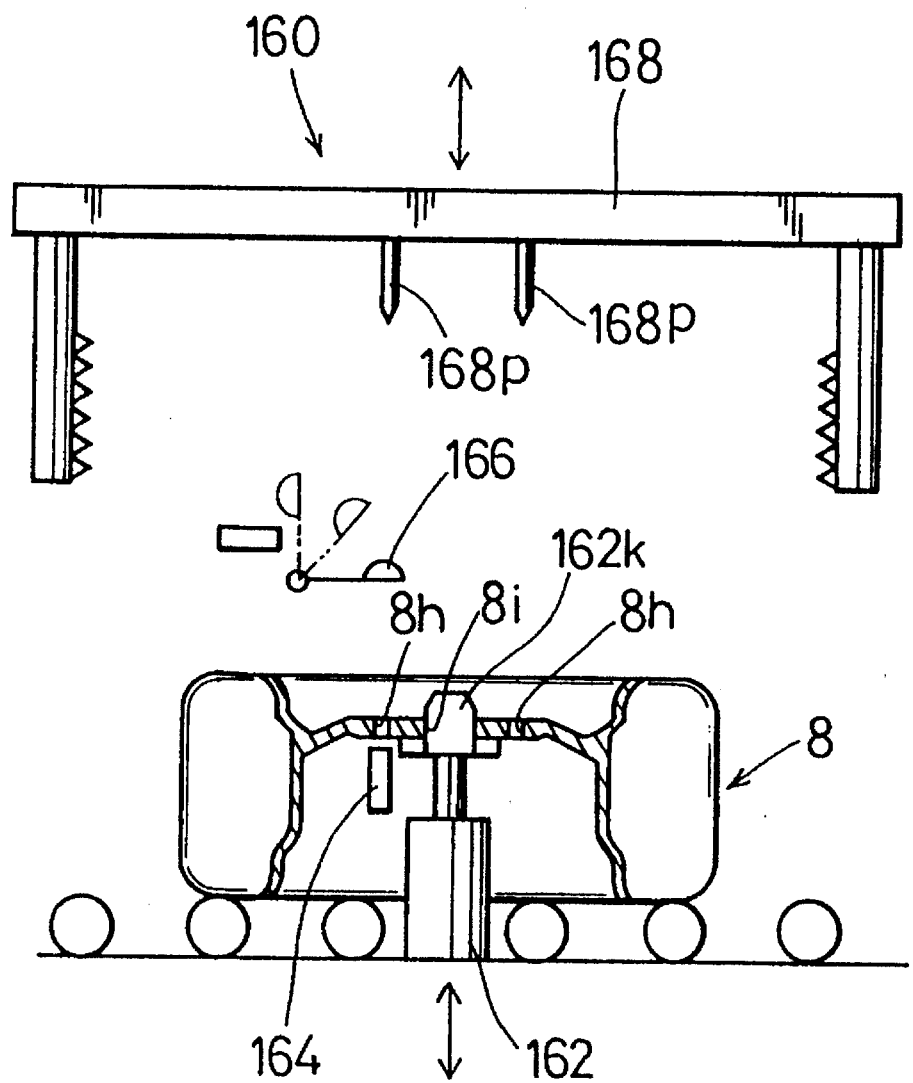
FIG. 8 is a side view showing a wheel phase matching mechanism.

The wheel phase matching mechanism 160 serves for matching the phase of the hub bolt holes 8h of the wheel 8 to the phase of the hub bolts 20b for supplying the phase-matched wheel 8 to the wheel mounting mechanism 170 to be described later, and it is shown in detail in FIG. 8.

The wheel phase matching mechanism 160 has a motor 162 for rotating the wheel 8 which is set horizontally at a predetermined position. The motor 162 is mounted vertically on a lift frame (not shown), and to its shaft end is secured a support member 162k which is to be inserted into a central hole 8i in the wheel 8 and which supports the wheel 8 from below at a prescribed position thereof.

The wheel phase matching mechanism 160 has a nozzle 164 for jetting air upward to the horizontally set wheel 8 and an air pressure sensor 166 which is disposed right above the nozzle 164 on the opposite side of the wheel 8 and which is operative by receiving the pressure of air jet from the nozzle 164. The nozzle 164 and the air pressure sensor 166 are disposed at prescribed positions on the orbit of movement of the hub bolt holes 8h of the wheel 8. The motor 162 is stopped at the timing of operation of the air pressure sensor 166.

With this construction, with the wheel 8 rotated by the motor 162 while the nozzle 164 is jetting air, a state is brought about in which a hub bolt hole 8h of the wheel 8 is brought to be between the nozzle 164 and the air pressure sensor 166. In this state, air jet from the nozzle 164 strikes the air pressure sensor 166, thus causing the operation of the air pressure sensor 166. Thus, the motor 162 is stopped at this position to obtain phase matching of the hub bolt hole 8h of the wheel 8 to the position of the nozzle 164 and air pressure sensor 166. In this way, the phase matching of the wheel 8 is completed.

The wheel phase matching mechanism 160 includes a hand 168 for transporting the phase-matched wheel 8 to the wheel mounting mechanism 170. The hand 168 can clamp the wheel 8 in the diametrical directions thereof and can be raised and lowered right above the motor 162. It has phase matching pins 168p provided on its central portion and to be inserted into the hub bolt holes 8h of the phase-matched wheel 8. With the insertion of the phase matching pins 168p in the hub bolt holes 8h, reliable mechanical phase matching can be obtained. In addition, the phase-matched wheel 8 can be clamped by the hand 168 without possibility of phase deviation.

The wheel phase matching mechanism 160 corresponds to the wheel phase matching unit according to the invention.

As shown in FIG. 3, on a front portion of the truck 100, a front table 116 is mounted, which is a floating table capable of displacement in the L-and W-axis directions and also in the θ direction. The wheel mounting mechanism 170 and the hub nut tightening mechanism 180 are mounted via a front lift table 118 on the front table 116 on each side thereof in the transverse direction. The front table 116 has reference pins 126 provided at its prescribed positions. When the reference pins 126 are raised and inserted into reference holes (not shown) in the hanger 4, the front table 116 is positioned to be in a predetermined positional relation to the car body 2.

Figure 9A:
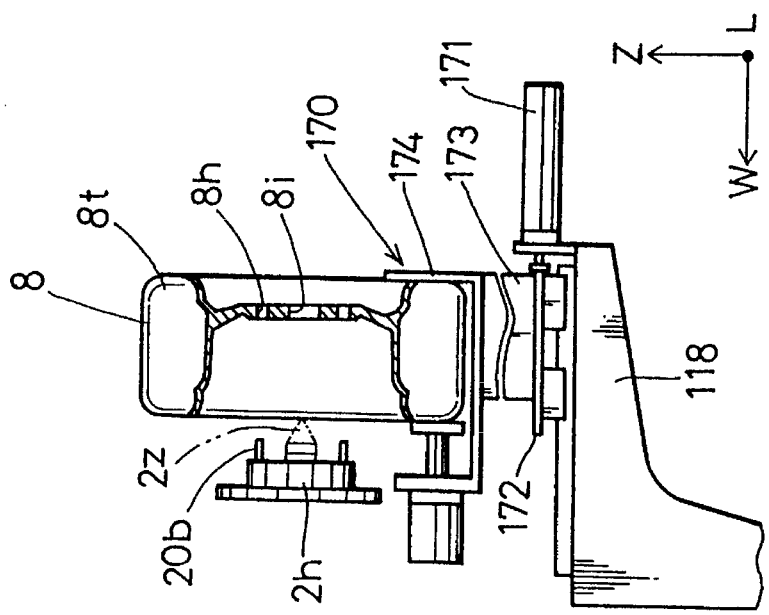
FIGS. 9(A) and 9(B) are a front view and a side view, respectively, showing a wheel mounting mechanism.
Figure 9B:
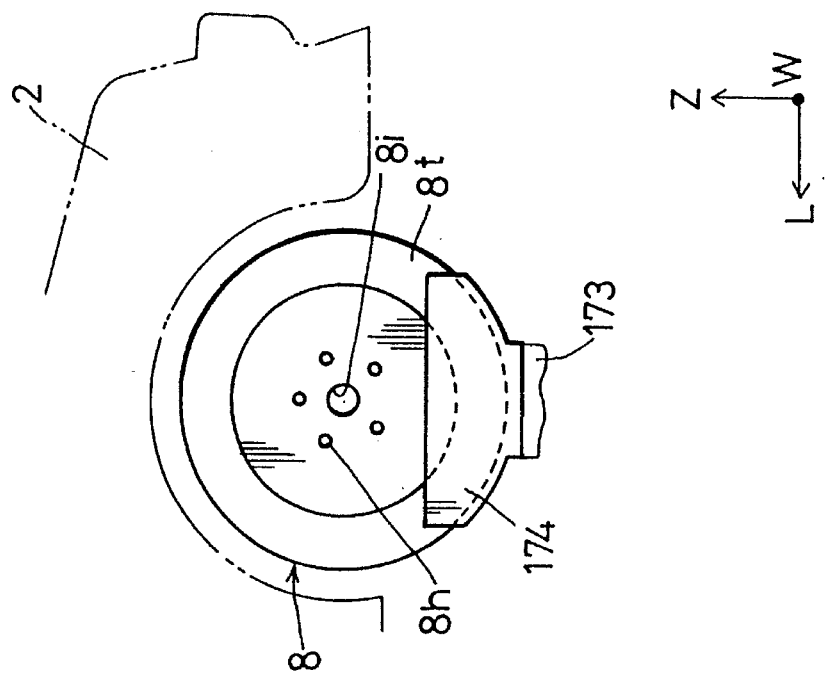

The wheel mounting mechanism 170 serves for mounting each wheel 8 supplied from the wheel phase matching mechanism 160 to each hub 2h of the car body 2, and it is shown in detail in FIGS. 9(A) and 9(B).

The wheel mounting mechanism 170 includes a movable plate 172 which is provided on the front lift table 118 and which can be moved in the W-axis directions by a W-axis cylinder mechanism 171. On the movable plate 172, a tire support frame 174 is mounted via an L, Z and θ direction floating mechanism 173. The tire support frame 174 can be brought into contact from below with the tread of a tire 8t and clamps the side wall of the tire 8t with a clamp cylinder mechanism 174c, thus supporting the wheel 8 in the upright state.

With this construction, when the guide cap 2z of the hub 2h is inserted into the hole 8i in the wheel 8 with the movement of the movable table 172 in the W-axis direction, the center line of the wheel 8 is aligned with the center line of the guide cap 2z by the action of the floating mechanism 173 during the insertion of the guide cap 2z into the hole 8i. Further, the hub bolts 20b of the hub 2h are inserted into the hub bolt holes 8h of the wheel 8. In this way, the mounting of the wheel 8 on the hub 2h is completed.

Figure 10:
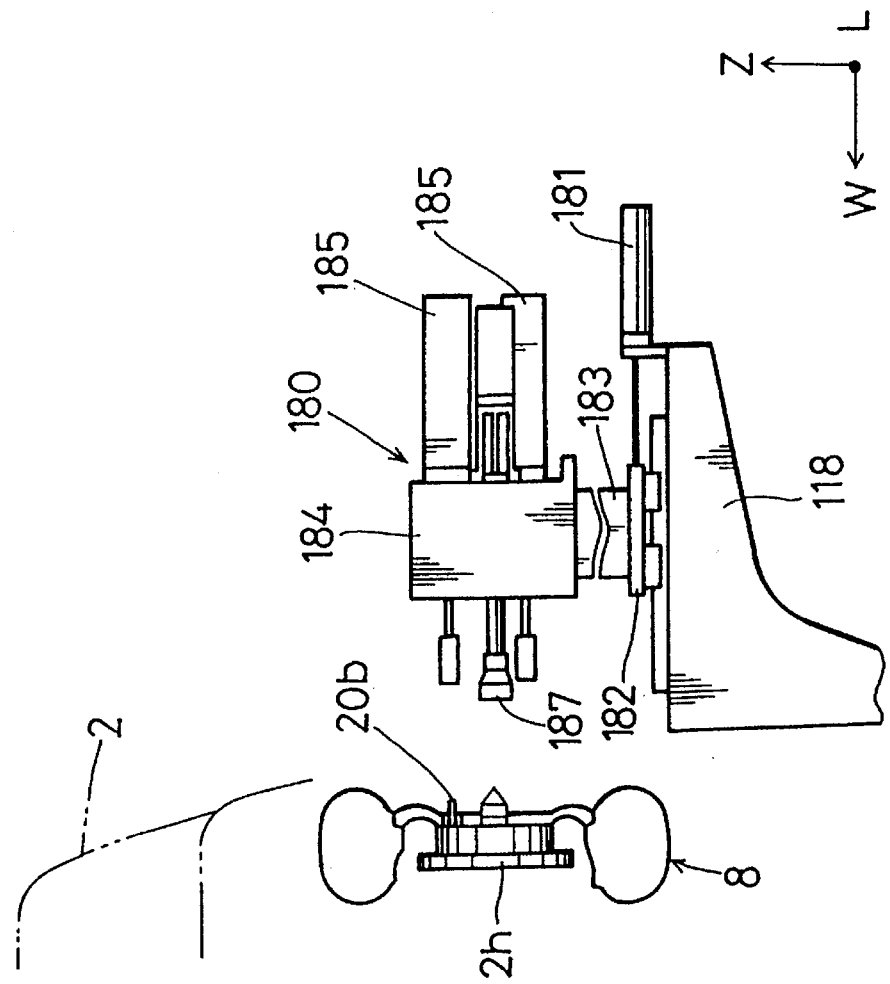
FIG. 10 is a side view showing a hub nut tightening mechanism.
Figure 11:
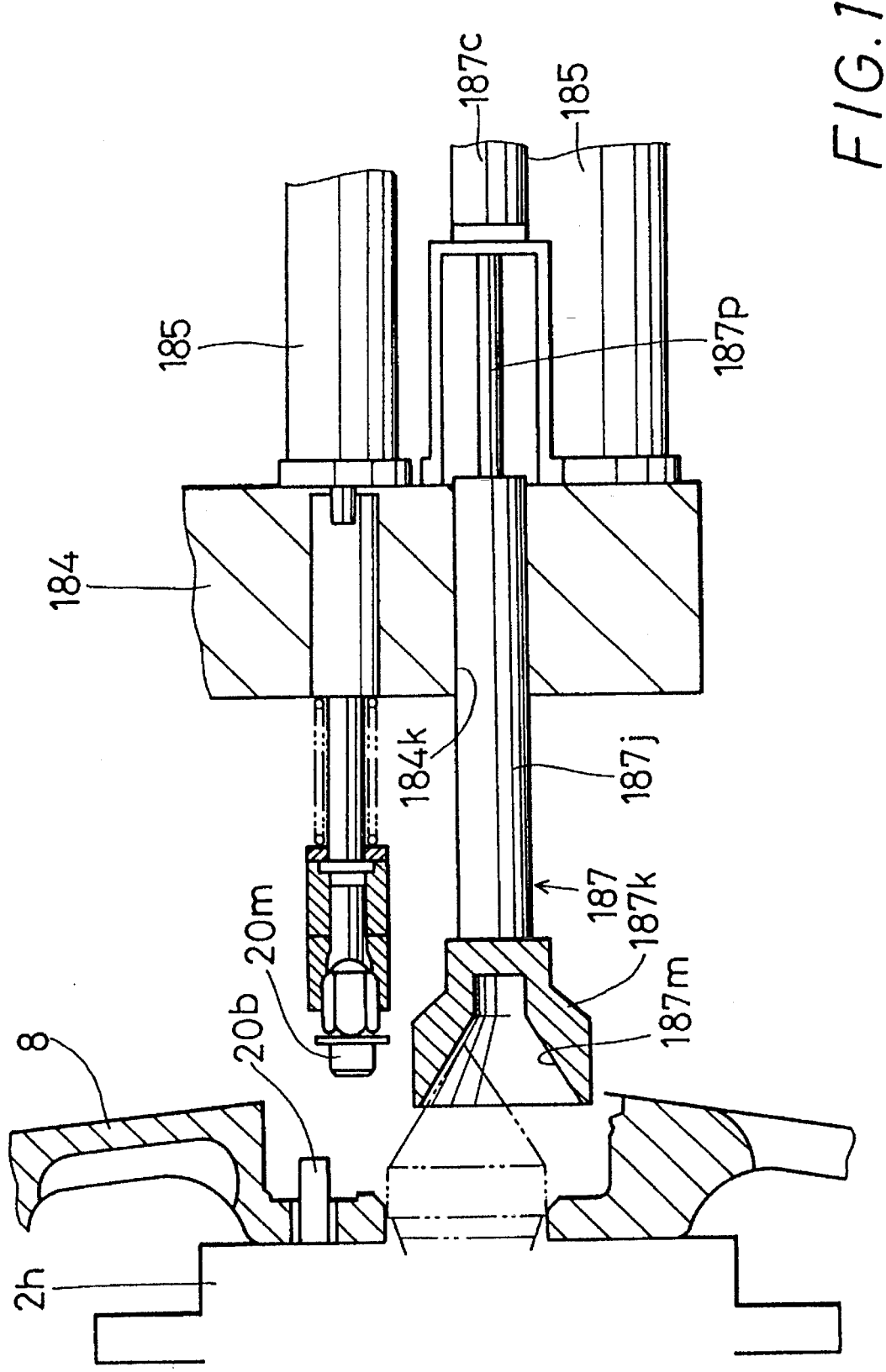
FIG. 11 is a fragmentary detailed view showing a hub nut tightening mechanism.

The hub nut tightening mechanism 180 serves for tightening each hub nut 20n on each hub bolt 20b with the wheel 8 mounted on the hub 2n, and it is shown in detail in FIGS. 10 and 11.

The hub nut tightening mechanism 180 includes a movable table 182 which is provided on the front lift table 118 and movable in the W-axis directions by a W-axis cylinder mechanism 181. A hub nut runner holder 184 is mounted on the movable table 182 via an L and Z direction floating mechanism 183. The hub nut tightening mechanism 180 is mounted on the front lift table 118 such that it is in a predetermined positional relation to the wheel mounting mechanism 170.

On the hub nut runner holder 184, five hub nut runners 185 are mounted such that they extend parallel to the W-axis and correspond in position to the respective five hub bolts 20b secured to the hub 2h of the car body 2. Each hub nut runner 185 can be automatically supplied with each hub nut 20n from a hub nut feeding mechanism 240 to be described later, and it can be rotated by 90° in the L-axis direction when receiving the hub nut 20n. The five hub nut runners 185 are arranged about a socket extension 187 which can position the hub nut runner holder 184 and which extends parallel to the hub nut runners 185.

As shown in FIG. 11, the socket extension 187 has a shaft 187j which is slidably inserted through a through hole 184k formed in the hub nut runner holder 184. To the end of the shaft 187j is secured a socket 187k having a tapered hole 187m to be fitted on the guide cap 2z of the hub 2h. To the other end of the shaft 187j is coaxially coupled a piston rod 187p of a pushing cylinder mechanism 187c. The pushing cylinder mechanism 187c is secured by a bracket 184t to the hub nut runner holder 184. In the pushing cylinder mechanism 187c, the piston rod 187p is held advanced with a predetermined force. When a greater external force is applied, the piston rod 187p is retreated into the cylinder according to the applied external force.

With this construction, when the guide cap 2z of the hub 2h is brought into engagement with the socket 187k of the socket extension 187 with the movement of the movable table 182 in the W-axis direction, the center line of the socket extension 187 is aligned with the center line of the guide cap 2z of the hub 2h by the action of the floating mechanism 183 during the course of the engagement between the guide cap 2z and the socket 187. Further, with movement of the hub nut runner holder 184 toward the hub 2h, the hub nut 20n set on each hub nut runner 185 is tightened on each hub bolt 20b with the guide cap 2z held in engagement with the socket 187k.

The wheel mounting mechanism 170, hub nut tightening mechanism 180, front table 116, front lift table 118, etc. altogether correspond to the wheel setting and hub nut tightening unit according to the invention.

As shown in FIG. 1, a wheel feeding mechanism 220 is disposed on each side of the truck 100 and is adapted to feed wheels 8 to the associated wheel phase matching mechanism 160 on the truck 100 with the truck 100 held at the initial position A.

The wheel feeding mechanism 220 includes a conveyor 222 for conveying a plurality of wheels 8 in a side-by-side arrangement to a predetermined position and a rod-less cylinder mechanism 224 for pushing a wheel 8 set at a predetermined position into the wheel phase matching mechanism 160. The rod-less cylinder mechanism 224 is operated under a condition that the truck 100 is found at the initial position A.

A hub nut feeding mechanism 240 is disposed around the truck 100 and is adapted to feed hub nuts 20n to the hub nut tightening mechanisms 180 with the truck 100 at the initial position A.

As shown in the overall lay-out view of FIG. 1 and the detailed views of FIGS. 12 and 13(A) to 13(C), the hub nut feeding mechanism 240 includes a hub nut feeder 242, a pallet storage conveyor 246 for conveying pallets 244 for receiving hub nuts 20n, hub nut loaders 247a and 247b for clamping each hub nut 20n out of each pallet 244 and bringing the clamped hub nut to a predetermined position, and hub nut transferring units 248a and 248b each for receiving each hub nut 20n from each of the hub nut loaders 247a and 147b and setting the received hub nut 20n on each hub nut runner 185 of the hub nut tightening mechanism 180.

In the hub nut feeder 242, different kinds of hub nuts 20n are stored in units each of five (for one wheel) such that they are indexed. According to a production command signal, the hub nut feeder 242 feeds five indexed hub nuts 20n to one of the pallets 244 on the pallet storage conveyor 246. To one pallet 244 are fed two units of (i.e., ten) hub nuts 20n, i.e., hub nuts 20n for two, i.e., a front and a rear, wheels. After the hub nuts 20n for the right side two wheels have been fed to one pallet 244, the hub nuts 20n for the left side two wheels are then fed to the next pallet 244.

In this way, of the pallets 224 with the hub nuts 20n fed thereto, the pallet 224 for the right side wheels is conveyed by the pallet storage conveyor 246 to the position of the right side wheel hub nut loader 247a, while that for the left side wheels is conveyed to the position of the left side wheel hub nut loader 247b.

As shown in FIG. 12, in each of the hub nut loaders 247a and 247b, each hub nut 20n in each pallet 244 having been conveyed up to a prescribed position, is clamped by the hand 247b to be brought to the position of each of the left and right hub nut transferring units 248a and 248b.

Figure 13A:
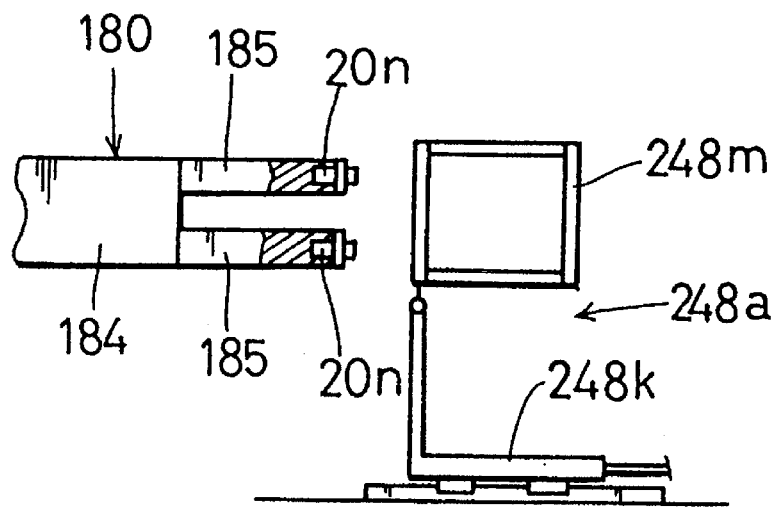
FIGS. 13(A) to 13(C) are views showing the hub nut transferring unit in detail.
Figure 13B:
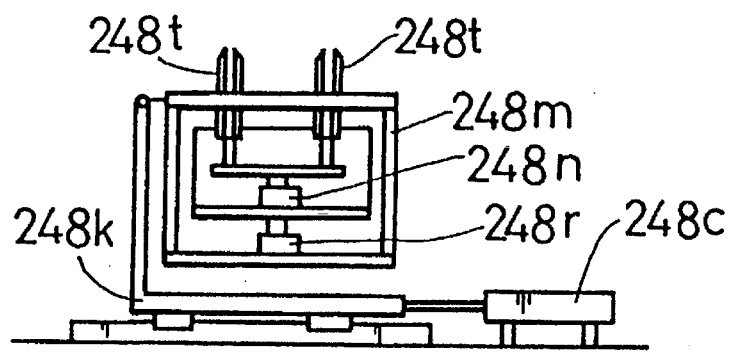
Figure 13C:
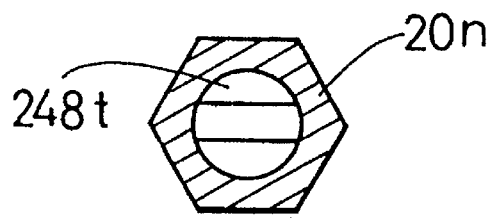
Figure 14A:
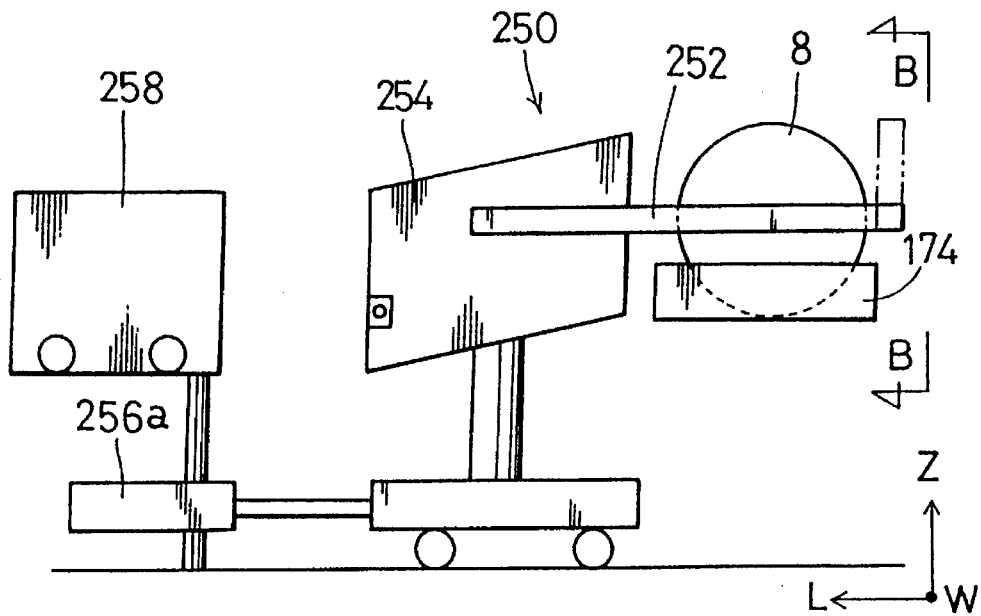
FIGS. 14(A) and 14(B) are a side view and a detailed view, respectively, showing a wheel kick-out unit.
Figure 14B:
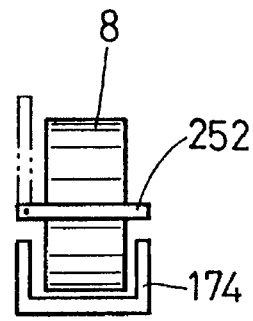

The left and right hub nut transferring units 248a and 248b (hereinafter referred to as hub nut transferring units 248) each has a movable frame 248k which can be moved in the L-axis directions (directions of progress of the truck 100) by an L-axis cylinder mechanism 248c. A unit body 248m is mounted on the movable frame 248k such that it can be rotated by 90x from its vertical position to its horizontal position. As shown in FIG. 13(B), five collets 248t are provided such that they are positioned in accord with the respective five hub nut runners 185. As shown in FIG. 13(C), each of the collets 248t can take hold of the hub nut 20n from the inner side. The operation of each collet 248t to take hold of the hub nut 20n is performed by a crank angle cylinder mechanism 248n, and the collet 248t is moved by a cylinder mechanism 248r.

With this construction, the hub nut transferring units 248 can receive hub nuts 20n from the hub nut loaders 247a and 247b with the unit body 248m held vertical. In addition, by rotating the unit body 248m to the horizontal position and moving the movable frame 248k in the L-axis direction, each unit can set each hub nut 20n on each nut runner 185 of the hub nut tightening mechanism 180. Conversely, it is possible to take out the hub nut 20n from each hub nut runner 185.

Figure 19:
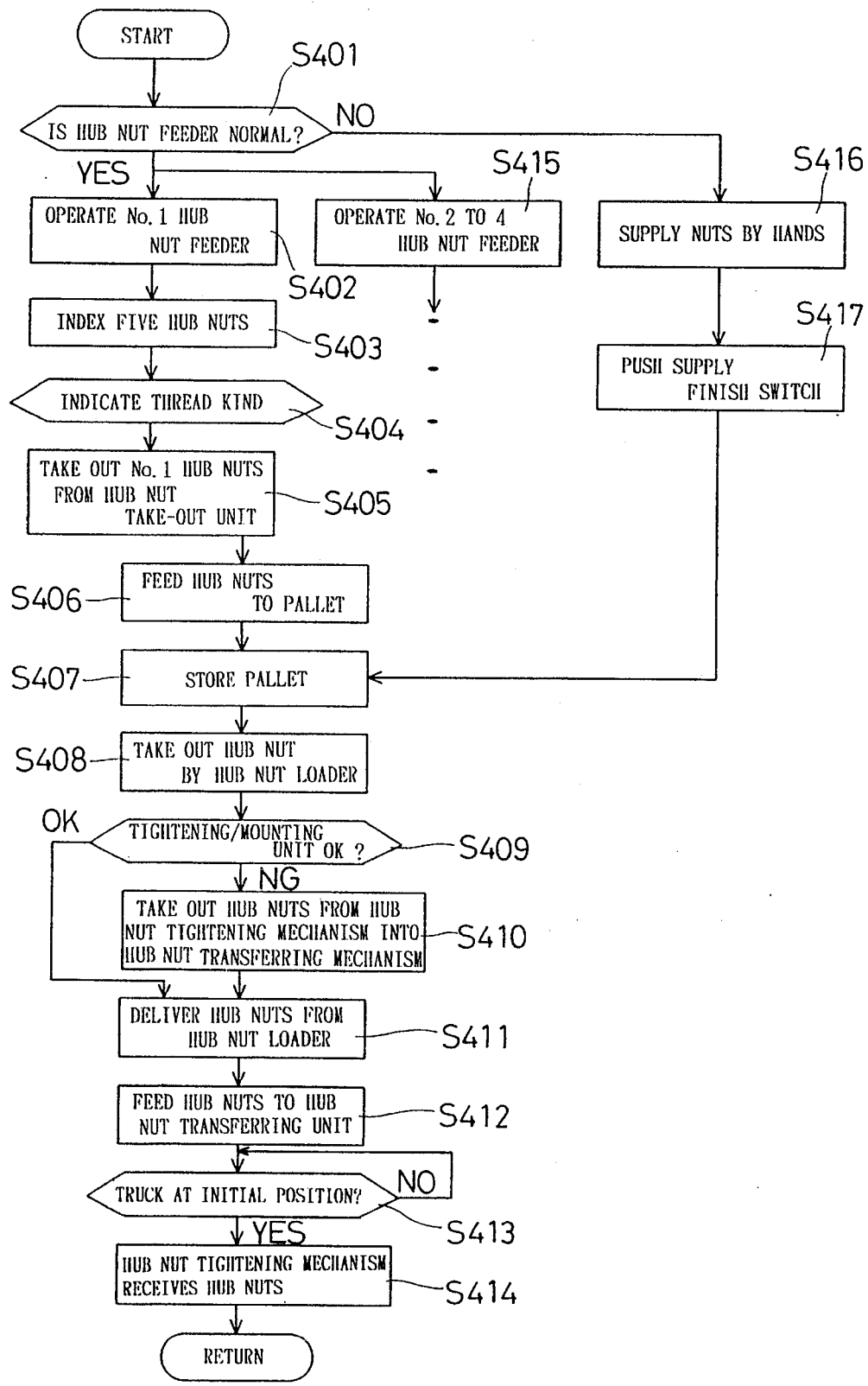
FIG. 19 is a flow chart illustrating a hub nut feeding mechanism operation routine.
Figure 20:
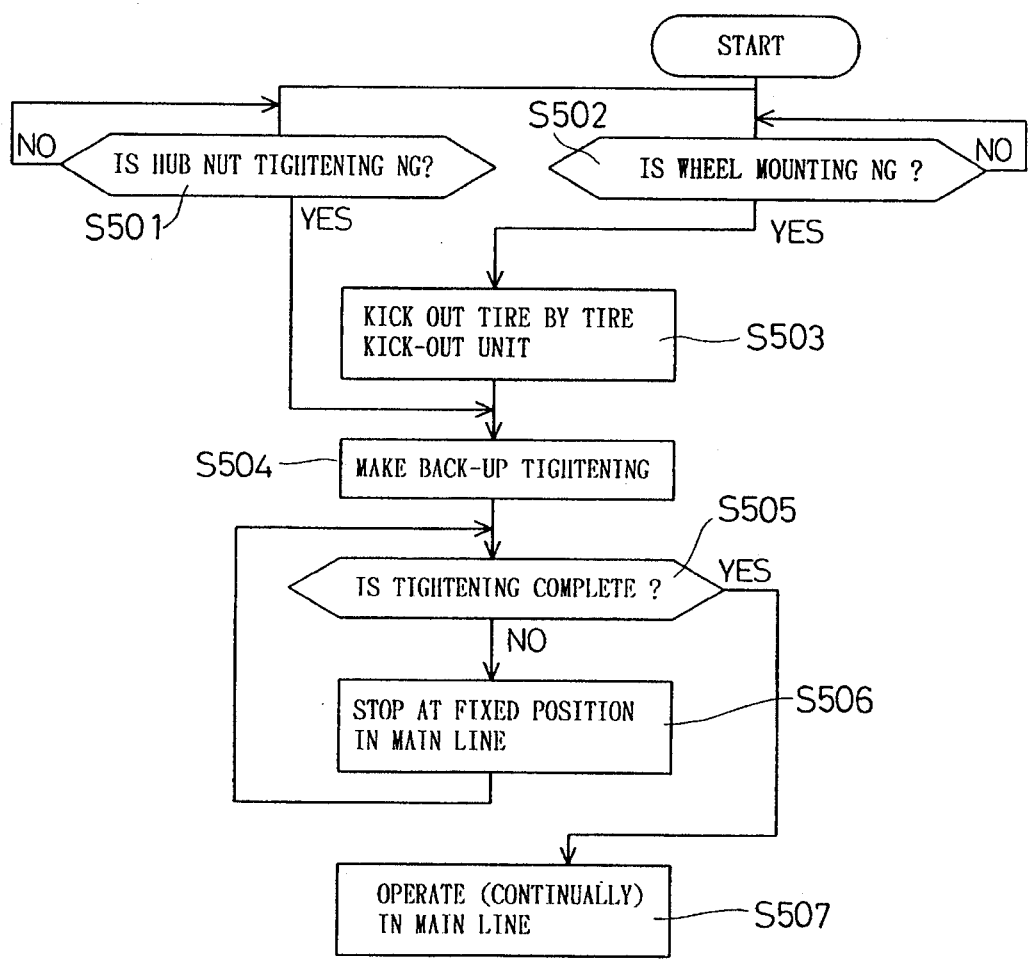
FIG. 20 is a flow chart illustrating a back-up routine.

The routine of operation of the hub nut feeding mechanism 240 comprises steps S401 to S414 shown in FIG. 19.

As shown in FIG. 1, a wheel kick-out mechanism 250 is provided ahead of the truck 100. The wheel kick-out mechanism 250 is provided for receiving the wheel 8 which has been failed to be mounted by the wheel mounting mechanism 170, from the wheel mounting mechanism 170 and for bringing out the received wheel 8 to the back-up station, and it is shown in detail in FIGS. 14(A) and 14(B).

The wheel kick-up mechanism 250 includes a wheel pull-in bar 252 disposed side-wise of the tire support frame 174 of the wheel mounting mechanism 170 and a movable frame 254 for supporting the wheel 8 pulled in by the wheel pull-in bar 252 and bringing the supported wheel 8 to the back-up station 50. The movable frame 254 can be moved in the L-axis directions by an air cylinder mechanism 256a. When the mechanism 250 reaches the back-up station 50, it supplies the wheel 8 to a stationary frame 258.

The operation of the wheel assembling system according to the embodiment of the invention will now be described with reference to the flow charts of FIGS. 16 to 20.

Figure 18:
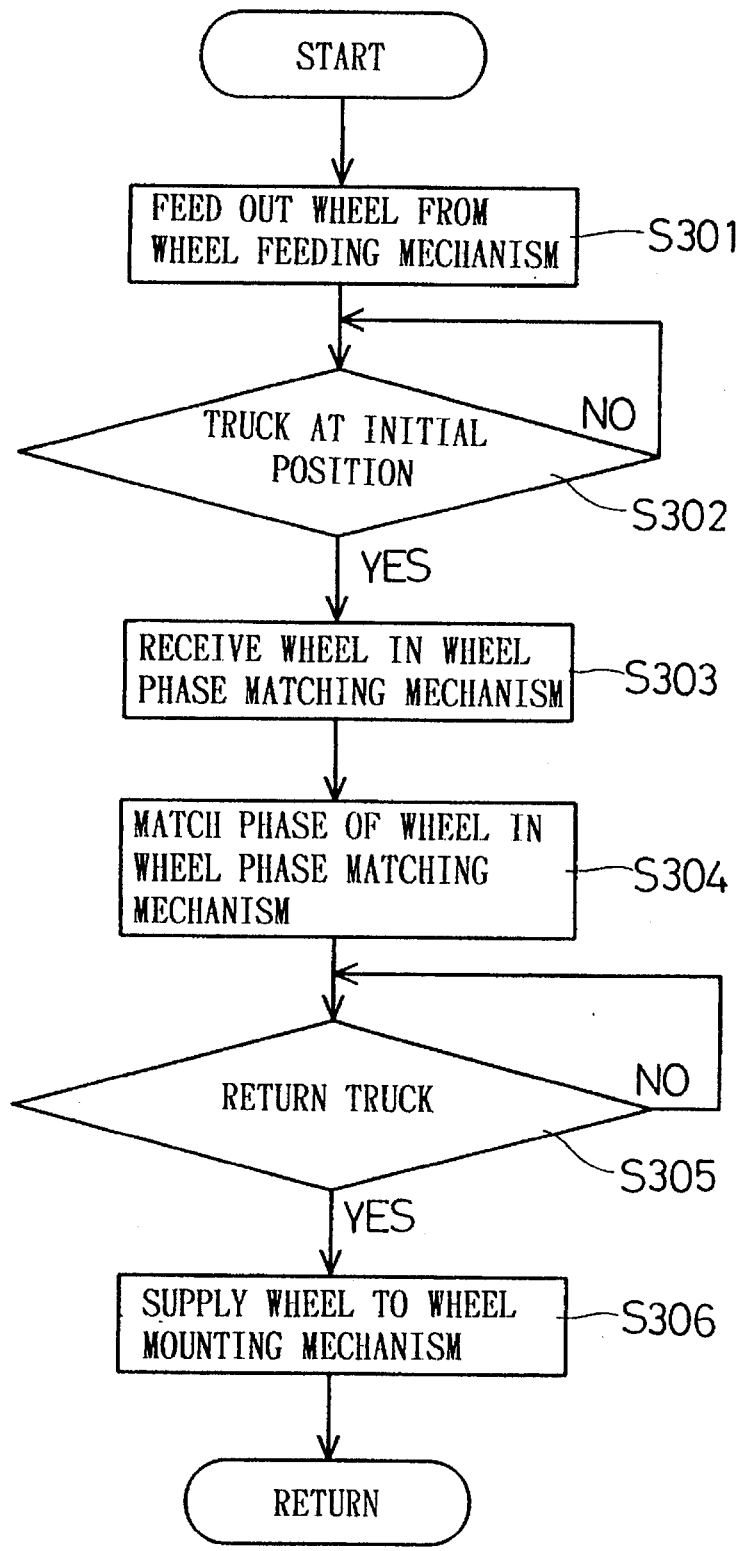
FIG. 18 is a flow chart illustrating a wheel phase matching routine.

First, as a preparation for mounting wheels 8, each wheel 8 fed out from each wheel feeding mechanism 220 is phase matched in each wheel phase matching mechanism 160 in a routine comprising steps S301 to S306 in FIG. 18. The phase-matched wheel 8 is set in the corresponding wheel mounting mechanism 170.

In addition, as described above, the hub nut feeding mechanism 240 is operated in a routine comprising steps S401 to S414 in FIG. 19, and each hub nut 20n is set on each hub nut runner 185 in the hub nut tightening mechanism 180.

Figure 2A:
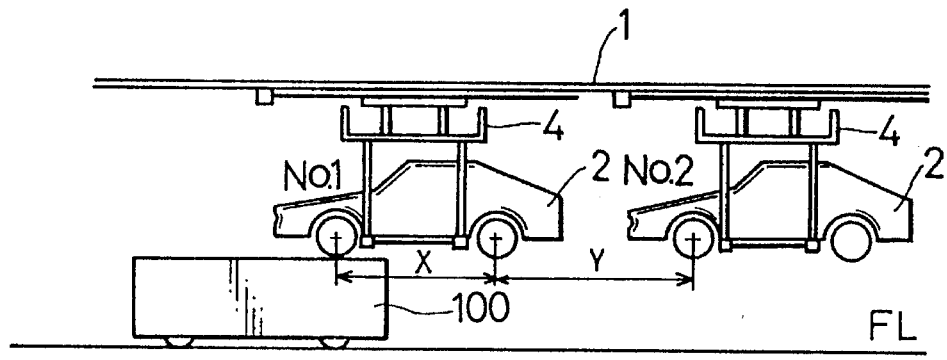
FIGS. 2(A) to 2(C) are side views showing the positional relation between a can body conveying line and the wheel assembling system.
Figure 16:
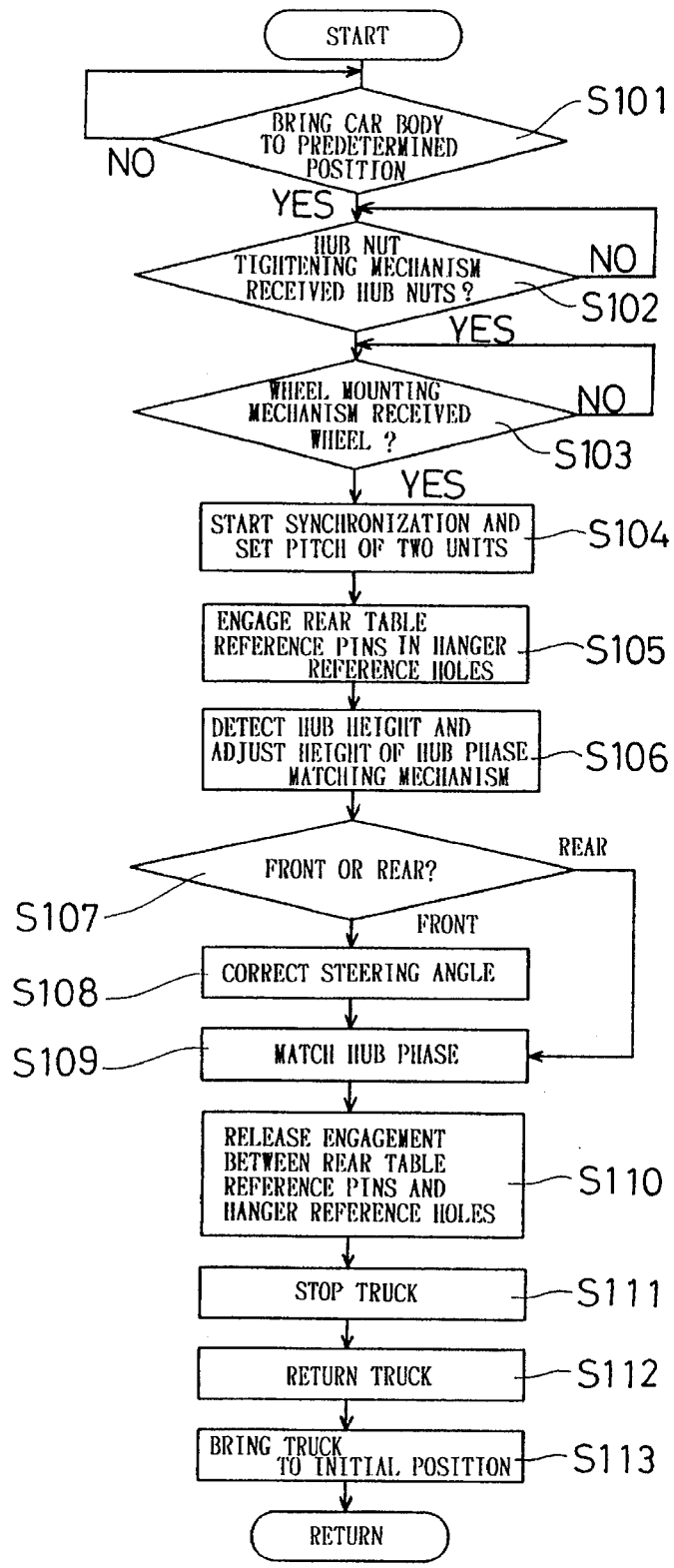
FIG. 16 is a flow chart illustrating a steering angle correcting and phase matching routine.

When the preparation for mounting wheels 8 has been completed, a portion of the first car body 2 (No. 1 car body 2) is brought to a predetermined position on the truck 100, as shown in FIG. 2(A). Then, steps S104 and S105 in FIG. 16 are executed. Specifically, the truck 100 is caused to run in synchronism with the car body conveying line 1, and the reference pins 106 provided on the rear table 102 of the truck 100 is raised and inserted into the reference holes in the forward hanger 4 suspending the car body 2. As a result, the rear table 102 of the truck 100 is positioned to be in a predetermined positional relation to the No. 1 car body 2.

Subsequently, the rear lift table 104 is raised up to a prescribed height, and the height of the front wheel hub 2h of the No. 1 car body 2 is detected by the hub height detecting mechanism 150. This operation is executed in step S106. Further, the height of the axis of the rotary actuator 145 of the hub phase matching mechanism 140 is matched to the height of the center of the hub 2h.

Then, the reference table 135 of the steering angle correcting mechanism 130 is raised, and the pins 136 and the bracket support members 137 mounted on the reference table 135 are brought into .engagement with the reference holes 2k of the sub-frame 2s of the No. 1 car body 2 and the lower arms 2r. Thus, the reference table 135 is positioned to be in a predetermined positional relation to the car body 2. In this state, the arm pushing mechanism 138 on the reference table 135 is operated to cause the knuckle arms 2n of the car body 2 to be pushed outward to an equal extent from the inner side. In this way, steering angle correction is made to have the hubs 2h to be parallel to the progress directions (i.e., L-axis directions). This operation is executed in step S108. Further, in step S109, phase matching of the hub 2h is a made by the hub phase matching mechanism 140.

When the front wheel steering angle correction and the phase matching of the hub 2h have been completed in this way, steps S109 to S113 are executed, in which the reference pins 106 of the rear table 101 are lowered to release the engagement between the reference pins 106 and the reference holes in the hanger 4, and the truck 100 is returned to the initial position A.

When the truck 100 is returned to the initial position A, the rod-less cylinder mechanism 224 of the wheel feeding mechanism 220 is operated to feed a wheel 8 to the wheel phase matching mechanism 160 on the truck 100. Then, in steps S301 to S304 in FIG. 18, the wheel phase matching mechanism 160 matches the phase of the wheel 8.

Figure 2B:
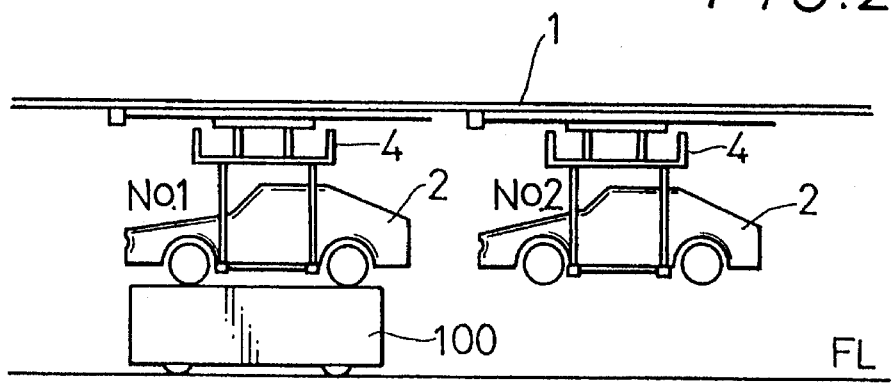
Figure 17:
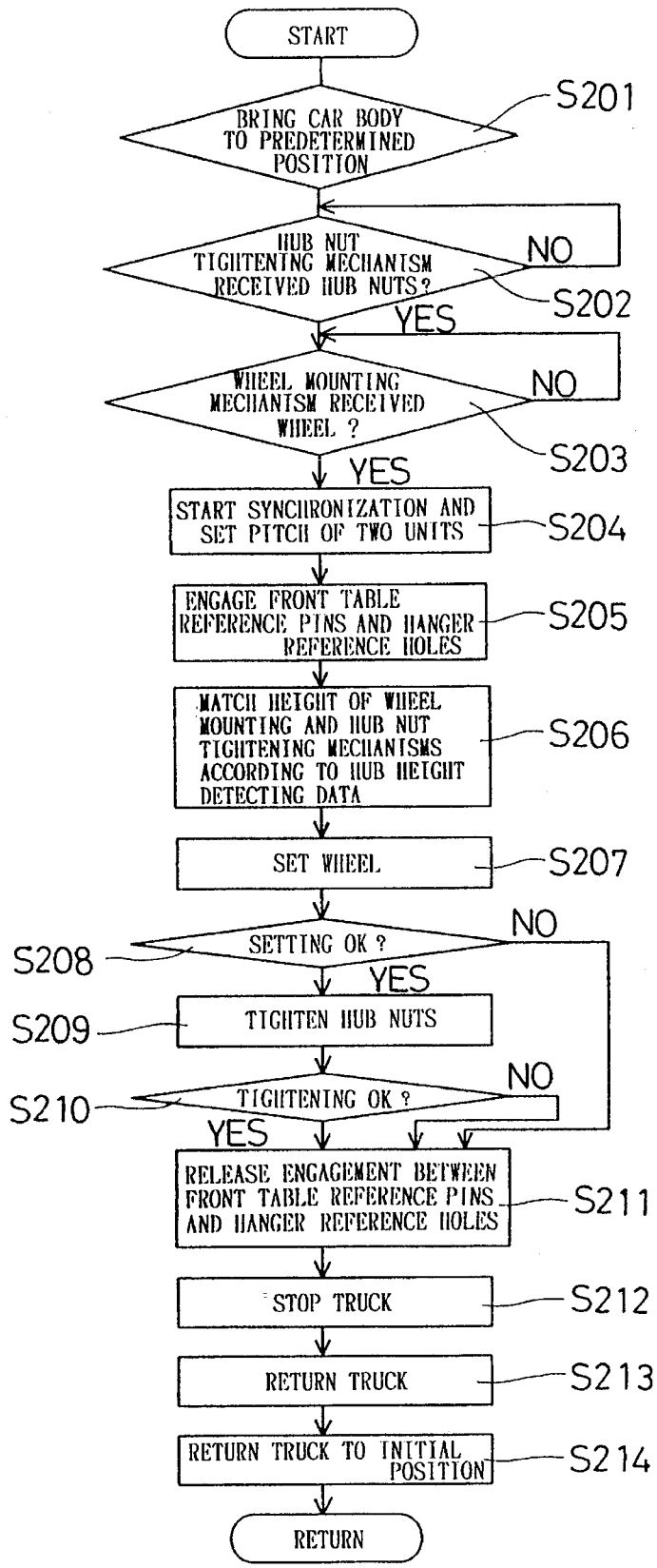
FIG. 17 is a flow chart illustrating a wheel setting and hub nut tightening routine.

Then, the front and rear wheel portions of the No. 1 car body 2 are brought to predetermined positions on the truck 100 as shown in FIG. 2(B). Then, step S104 in FIG. 16 and step S204 in FIG. 17 are executed. Specifically, the truck 100 is caused to run in synchronism with the car body conveying line 1, and the pitch switch cylinder mechanism 108 on the truck 100 is driven to set the distance between the rear and front tables 102 and 116 to a distance X between the front and rear wheels of the car body 2.

Then, step S105 in FIG. 16 and step S205 in FIG. 17 are executed. Specifically, the reference pins 126 provided on the front table 116 on the truck 100 are raised and inserted into the reference holes of the forward hanger 4. Also, the reference pins 106 provided on the rear table 101 on the truck 100 are raised and inserted into the reference holes of the rearward hanger 4. Thus, the front and rear tables 116 and 102 are positioned to be in predetermined positional relations to the No. 1 car body 2.

Further, step S206 in FIG. 17 is executed for the front wheel of the No. 1 car body 2. Specifically, the front lift table 118 is lifted according to the height data of the front wheel hub 2h that has been obtained before the previous hub phase matching, so that the height of the wheel mounting mechanism 170 and the hub nut tightening mechanism 180 is matched to the height of the hub 2h. Then, steps S207 to S211 are executed in which the wheel 8 is mounted, and if the mounting of the wheel 8 is satisfactory, the hub nuts 20n are tightened. Further, if the tightening of the hub nuts 20n is satisfactory, the reference pins 126 of the front table 116 are lowered to release the engagement between the reference pins 126 and the reference holes in the hanger 4. For the rear wheel of the No. 1 car body 2, steps S106 to S110 in FIG. 16 are executed. Specifically, after the height detection and phase matching of the hub 2h, the engagement between the reference pins 106 of the rear table 102 and the reference holes of the hanger 4 is released. For the rear wheel, the steering angle correction is not made.

When the engagement of the front and rear tables 116 and 101 on the truck 100 with the hanger 4 is released in the above way, steps S111 to S113 in FIG. 16 and steps S212 to S214 in FIG. 17 are executed in which the truck 10 is returned to the initial position A. While the truck 100 is returned to the initial position A, steps S305 and S306 in FIG. 18 are executed in which the phase-matched wheel 8 is supplied from the wheel phase matching mechanism 160 to the wheel mounting mechanism 170.

Further, when the truck 100 is returned to the initial position A, the rod-less cylinder mechanism 224 of the wheel feeding mechanism 220 is operated to feed a wheel 8 to the wheel phase matching mechanism 160. Further, the hub nut feeding mechanism 240 sets hub nuts 20b in the hub nut tightening mechanism 180.

Where the No. 1 car body 2 is a four-wheel drive, rotation of the rear wheel hub 2h that is caused at the time of the hub phase matching causes rotation of the front wheel hub 2h to result in a deviation from the phase that has once been matched. Accordingly, with a four-wheel drive, the rear wheel hub is phase matched after completion of the assembling of the front wheel 8.

Figure 2C:
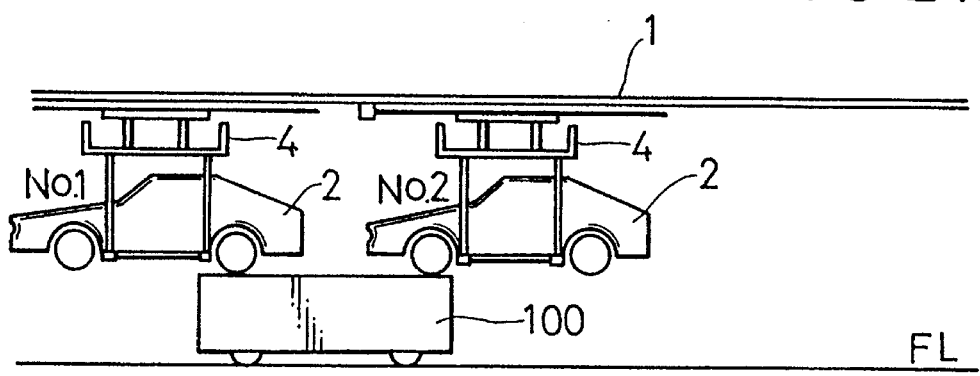

Subsequently, the rear wheel portion of the No. 1 car body 2 and the front wheel portion of the No. 2 car body 2 are brought to predetermined positions on the truck 100 as shown in FIG. 2(C). Then, step S104 in FIG. 16 and step S204 in FIG. 17 are executed. Specifically, the truck 100 is caused to run in synchronism with the car body conveying line 1, and the pitch switch cylinder mechanism 108 on the truck 100 is driven to set the distance between the rear and front tables 102 and 116 to a distance Y between the rear wheel of the No. 1 car body 2 and the front wheel of the No. 2 car body 2.

In the above routine, the assembling of the rear wheel of the No. 1 car body 2 and the steering angle correction and the phase matching with respect to the front wheel of the No. 1 car body 2 can be carried out concurrently.

In the event of occurrence of a trouble or a failure in the operation of the automatic mounting of the wheel 8, for instance, when a trouble takes place in the hub nut feeder 242 of the hub nut feeding mechanism 240 due to such cause as clogging of a hub nut 20n, the operation of only the hub nut feeder 242 is stopped, and the pallet storage conveyor 246, the hub nut loaders 247a and 247b and the hub nut transferring units 248a and 248b are operated continually. Since the pallet storage conveyor 246 carries a plurality of pallets 244 stored thereon, the hub nut feeding mechanism 240 can be operated without being stopped while these pallets 244 are present on the conveyor 246. When a trouble which requires a long time for repair takes place in the hub nut feeder 242, the operator directly supplies hub nuts 20n to the pallets 244 on the pallet storage conveyor 246. This routine corresponds to steps S416 and S417 in FIG. 19.

In the case of the defective tightening of any hub nut 20n, if at least one of the five hub nuts 20n has been tightened normally, the wheel 8 does not fall off the hub 2h, and thus, the system is operated continually. In this case, the occurrence of the trouble is displayed in a subsequent step, and the operator executes re-tightening of the hub nut 20n in question. This routine corresponds to steps S501 and S504 to S507 in FIG. 20.

In the case of the defective mounting of wheel 8, the wheel mounting mechanism 170 delivers that wheel 8 to the wheel kick-out mechanism 250, and the truck 100 is returned to the initial position A. The wheel kick-up mechanism 250 feeds the received wheel 8 to the back-up station 50, in which the operator manually sets the wheel 8 and tightens the hub nuts 20n. This routine corresponds to steps S502 to S507 in FIG. 20.

Meanwhile, hub nuts 20n which have not been tightened remain in the hub nut tightening mechanism 180 on the truck 100 that has returned to the initial position A. Thus, the hub nut transferring unit 248 of the hub nut feeder 240 removes the remaining hub nuts 20n from the hub nut tightening mechanism 180 and discards these hub nuts in the converse routine to that of feeding hub nuts 20n as shown in FIGS. 13(A) to 13(C). Then, it receives the next hub nuts 20n from the hub nut loader 247a or 247b and feeds these hub nuts to the hub nut runners 185. This routine corresponds to steps S409 to S414 in FIG. 19.

As has been described in detail in the foregoing, with the wheel assembling system according to the above embodiment, the setting of a wheel 8 on the front wheel hub 2h and the phase matching of the rear wheel hub 2h can be done concurrently. Further, concurrently with the setting of a wheel 8 on the rear wheel hub 2h of a car body 2, the steering angle correction and phase matching with respect to the front wheel of the rear adjacent car body 2 can be made. It is thus possible to eliminate waiting times in the individual units to permit more effective utility of the equipment and reduce the wheel mounting time. Further, since the steering angle correcting and phase matching unit and the wheel setting and hub nut tightening unit are mounted on the single truck 100 which can be moved in synchronism with the car body 2, there is no need of securing independent spaces for the movement of the steering angle correcting and phase matching unit and that of the wheel setting and hub nut, tightening unit, and thus it is possible to make the equipment compact. Further, since the steering angle correcting and phase matching unit and the wheel setting and hub nut tightening unit are disposed on the truck at mutually related prescribed positions thereof, it is possible to readily increase the accuracy of positioning.

Further, according to the invention, during the setting of a wheel on a predetermined hub by the wheel setting and hub nut tightening unit, the steering angle correcting and phase matching unit can make the steering angle correction and phase matching of the hub on which the next wheel is to be set. It is thus possible to eliminate the waiting time of each unit and reduce the wheel mounting time. Further, since the steering angle correcting and phase matching unit and the wheel setting and hub nut tightening unit are provided on the single truck, it is possible to make the equipment compact and readily ensure rated accuracy.

While the invention has been described with reference to a preferred embodiment thereof, it is to be understood that modifications or variations may be easily made without departing from the scope of the present invention which is defined by the appended claims.

What is claimed is:

1. A system for assembling wheels comprising:

a steering angle correcting and phase matching unit for correcting the steering angle of and matching the phase of a hub of a car body suspended and conveyed by a conveyor to a phase of a wheel to be mounted to the hub while being moved in synchronism with the car body; and a wheel setting and hub nut tightening unit for setting the wheel onto the phase-matched hub and tightening a hub nut thereon while being moved in synchronism with the car body;

the horizontal distance between said steering angle correcting and phase matching unit and said wheel setting and hub nut tightening unit being set to a distance such that when said wheel setting and hub nut tightening unit assembles a wheel onto the hub, said steering angle correcting and phase matching unit can correct the steering angle of and match the phase of the hub onto which the next wheel is to be set.

2. The system for assembling wheels according to claim 1, wherein said steering angle correcting and phase matching unit and said wheel setting and hub nut tightening unit are mounted on a truck capable of movement in synchronism with the car body.

3. The system for assembling wheels according to claim 2, further comprising a wheel phase matching unit for matching the phase of a wheel to, be supplied to said wheel setting and hub nut tightening unit to the hub, said wheel phase matching unit being mounted on the truck and adapted for matching the phase of the wheel to be set next while the truck is moved.

4. The system for assembling wheels according to claim 2, further comprising a distance adjuster for adjusting the distance between said two units said distance adjuster being mounted on the truck and capable of realizing a state in which the distance between said two units is equal to the distance between the front and rear wheels of the car body, and another state in which the distance between said two units is equal to the distance between the rear wheel of a car body being conveyed and the front wheel of an adjacent car body.

5. The system for assembling wheels according to claim 2, wherein said wheel setting and hub nut tightening unit is mounted on the front side of the car body in the conveying direction thereof, and wherein said steering angle correcting and phase matching unit is mounted on the rear side of the car body in the conveying direction thereof.

6. The system for assembling wheels according to claim 1, wherein said steering angle correcting and phase matching unit includes a hub height detecting mechanism for detecting the hub height of the car body, and wherein said wheel setting and hub nut tightens unit sets a wheel and tighten a hub nut according to hub height data from the hub height detecting mechanism.

7. The system for assembling wheels according to claim 1, further comprising a hub nut feeding mechanism for feeding hub nuts to said wheel setting and hub nut tightening unit, said hub nut feeding mechanism including a hub nut feeder for indexing each hub nut according to each car body and feeding each indexed hub nut to a pallet and a storage conveyor for stocking a plurality of pallets.

8. The system for assembling wheels according to claim 7, wherein said hub nut feeding mechanism includes a hub nut transferring mechanism for receiving each hub nut from each pallet stocked on the storage conveyor and feeding each received hub nut to said wheel setting and nut tightening unit, the hub nut transferring mechanism having a mechanism for removing, in the event of failure of tightening of a hub nut by said wheel setting and hub nut tightening unit, hub nuts remaining in said wheel setting and hub nut tightening unit.

9. The system for assembling wheels according to claim 1, further comprising a wheel kick-out mechanism for conveying a wheel which said wheel setting and hub nut tightening unit has failed to mount on the hub, to a back-up station.

* * * * *